United States Patent
Noiri et al.

(10) Patent No.: US 11,821,241 B2
(45) Date of Patent: Nov. 21, 2023

(54) SYSTEM AND METHOD FOR OPERATING A POWER TAILGATE SYSTEM

(71) Applicant: Aisin Technical Center of America, Inc., Northville, MI (US)

(72) Inventors: Yasuyuki Noiri, Walled Lake, MI (US); Gowtham Harsha Pulikonda, New Hudson, MI (US); Ryan Heins, Wixom, MI (US)

(73) Assignee: Aisin Technical Center of America, Inc., Northville, MI (US)

( * ) Notice: Subject to any disclaimer, the term of this patent is extended or adjusted under 35 U.S.C. 154(b) by 134 days.

(21) Appl. No.: 17/335,545

(22) Filed: Jun. 1, 2021

(65) Prior Publication Data

US 2022/0381067 A1    Dec. 1, 2022

(51) Int. Cl.
*E05B 81/20*    (2014.01)
*E05B 81/18*    (2014.01)
(Continued)

(52) U.S. Cl.
CPC .............. *E05B 77/54* (2013.01); *B62D 33/03* (2013.01); *B62D 33/037* (2013.01); *E05B 81/04* (2013.01);
(Continued)

(58) Field of Classification Search
CPC .......... E05B 81/20; E05B 81/54; E05B 81/04; E05B 81/18; E05B 81/58; E05B 81/66; E05B 77/54; B62D 33/037
See application file for complete search history.

(56) References Cited

U.S. PATENT DOCUMENTS

| 4,889,371 A * | 12/1989 | Girard | E05B 81/20 |
| | | | 292/201 |
| 6,175,202 B1 * | 1/2001 | Weyerstall | E05B 81/66 |
| | | | 318/443 |

(Continued)

FOREIGN PATENT DOCUMENTS

| DE | 102004034628 A1 * | 2/2006 | E05B 81/14 |
| WO | WO-2017103175 A1 * | 6/2017 | E05B 77/34 |

(Continued)

OTHER PUBLICATIONS

Espacenet, machine translation of WO 2020/090928 A1, generated May 12, 2023 (Year: 2023).*

*Primary Examiner* — Kristina R Fulton
*Assistant Examiner* — Emily G. Brown
(74) *Attorney, Agent, or Firm* — Christopher G. Darrow; Darrow Mustafa PC

(57) ABSTRACT

A system for controlling a vehicle power tailgate includes a latch structured to be movable to a latching position when the latch is engaged with a portion of a tailgate so as to maintain the tailgate in a closed position associated with the latching position of the latch. A latch actuator operably connected to the latch to control operation of the latch. A memory is communicably coupled to the processor and stores a tailgate control module including instructions that when executed by a processor cause the processor to, responsive to receipt of a tailgate opening command, control operation of the latch actuator to attempt move the latch to an over-stroke position of the latch and, responsive to a failure to move the latch to the over-stroke position within a predetermined time period, control operation of the latch actuator to move the latch to a fully-latched position of the latch.

16 Claims, 15 Drawing Sheets

(51) Int. Cl.
  *E05B 81/58* (2014.01)
  *E05B 81/66* (2014.01)
  *B62D 33/037* (2006.01)
  *E05B 77/54* (2014.01)
  *E05B 81/04* (2014.01)
  *E05B 83/00* (2014.01)
  *B62D 33/03* (2006.01)
  *E05F 15/622* (2015.01)

(52) U.S. Cl.
  CPC .............. *E05B 81/18* (2013.01); *E05B 81/20* (2013.01); *E05B 81/58* (2013.01); *E05B 81/66* (2013.01); *E05B 83/00* (2013.01); *E05F 15/622* (2015.01); *E05Y 2201/434* (2013.01); *E05Y 2900/544* (2013.01)

(56) References Cited

U.S. PATENT DOCUMENTS

| | | | | |
|---|---|---|---|---|
| 6,669,247 | B2 * | 12/2003 | Swan | E05B 81/20 |
| | | | | 292/216 |
| 7,438,346 | B1 * | 10/2008 | Breed | E05C 17/203 |
| | | | | 296/146.12 |
| 2006/0202652 | A1 * | 9/2006 | Amagasa | H02P 29/0241 |
| | | | | 318/434 |
| 2007/0126577 | A1 * | 6/2007 | Cervantes | E05B 85/24 |
| | | | | 340/686.1 |
| 2010/0107500 | A1 * | 5/2010 | Whinnery | E05B 81/20 |
| | | | | 49/279 |
| 2013/0060403 | A1 * | 3/2013 | Kerr | E05F 15/627 |
| | | | | 701/2 |
| 2014/0028440 | A1 * | 1/2014 | Takeuchi | E05F 15/77 |
| | | | | 340/5.61 |
| 2014/0088825 | A1 * | 3/2014 | Lange | E05B 81/14 |
| | | | | 701/36 |
| 2017/0370132 | A1 * | 12/2017 | Da Deppo | E05B 81/16 |
| 2019/0323281 | A1 * | 10/2019 | Ghannam | B60J 5/101 |
| 2020/0362600 | A1 * | 11/2020 | Rosales | E05B 81/20 |
| 2021/0082214 | A1 * | 3/2021 | Kim | H04B 17/318 |
| 2022/0298834 | A1 * | 9/2022 | Distefano | E05B 81/20 |

FOREIGN PATENT DOCUMENTS

| | | | | |
|---|---|---|---|---|
| WO | WO-2019233524 | A1 * | 12/2019 | E05B 77/36 |
| WO | WO-2020090928 | A1 * | 5/2020 | |

* cited by examiner

SYSTEM AND METHOD FOR OPERATING A POWER TAILGATE SYSTEM

TECHNICAL FIELD

The embodiments disclosed herein relate to vehicles with power tailgate (PTG) systems and, more particularly, to a power tailgate system incorporating a powered latch assembly operable to latch a tailgate in a closed position responsive to a tailgate closing command, and operable check a tailgate for an overload condition prior to release of the latch to enable the tailgate to be opened, responsive to a tailgate opening command.

BACKGROUND

Many vehicles include tailgates. The tailgates serve as closure panels, and are movable between closed positions and open positions. In addition to the tailgates themselves, the vehicles include latch assemblies. Among other things, the latch assemblies include latches for latching the tailgates. To close the tailgates, the latches are activated. When the latches are activated, the latches latch the tailgates as the tailgates are moved to the closed positions, and afterwards, when the tailgates are in the closed positions. To open the tailgates, the latches are deactivated. When the latches are deactivated, the latches unlatch the tailgates as the tailgates are moved to the open positions.

Many of today's vehicles with tailgates also include power tailgate systems. The power tailgate systems include tailgate actuators for the tailgates, and latch actuators for the latch assemblies. By the operation of the tailgate actuators and the latch actuators, the power tailgate systems automatically open the tailgates and automatically close the tailgates. To automatically open the tailgates, the power tailgate systems open the tailgates after deactivating the latches. To automatically close the tailgates, the power tailgate systems close the tailgates after activating the latches.

Users may generate requests to automatically open the tailgate when, unbeknownst to them, there is loading on the tailgate. However, when the tailgate is overloaded, and the PTG system automatically opens the tailgate, the PTG system and/or any cargo in contact with the tailgate may be damaged.

SUMMARY

In one aspect of the embodiments described herein, a system for controlling a vehicle power tailgate is provided. The system includes a latch structured to be movable to a latching position when the latch is engaged with a portion of a tailgate so as to maintain the tailgate in a closed position associated with the latching position of the latch. The system also includes a latch actuator operably connected to the latch to control operation of the latch. The system also includes a processor and a memory communicably coupled to the processor and storing a tailgate control module including instructions that when executed by the processor cause the processor to, responsive to receipt of a tailgate opening command, control operation of the latch actuator to attempt move the latch to an over-stroke position of the latch and, responsive to a failure to move the latch to the over-stroke position within a predetermined time period, control operation of the latch actuator to move the latch to a fully-latched position of the latch.

In another aspect of the embodiments described herein, a method is provided, in a powered latch assembly for a vehicle tailgate, for checking for an overload condition of a tailgate secured in a closed condition by a latch prior to releasing the latch to enable opening of the tailgate. The method includes a step of, responsive to receipt of a tailgate opening command, controlling operation of a latch actuator to attempt to move the latch to an over-stroke position over-stroke the latch. The method also includes a step of, responsive to a failure to move the latch to the over-stroke position within a predetermined time period, controlling operation of the latch actuator to move the latch to a fully-latched position. The method also includes a step of, responsive to moving the latch to the over-stroke position within the predetermined time period, controlling operation of the latch actuator to move the latch to a release position enabling opening of the tailgate.

In yet another aspect of the embodiments described herein, a non-transitory computer-readable medium is provided for controlling operation of a vehicle power tailgate system to check a tailgate secured in a closed condition by a latch for an overload condition prior to releasing the latch, to enable opening of the tailgate. The medium stores instructions that when executed by one or more processors cause the one or more processors to, responsive to receipt of a tailgate opening command, control operation of a latch actuator to attempt to move the latch to an over-stroke position of the latch; responsive to a failure to move the latch to the over-stroke position within a predetermined time period, control operation of the latch actuator to move the latch to a fully-latched position; and responsive to moving the latch to the over-stroke position within the predetermined time period, control operation of the latch actuator to move the latch to a release position enabling opening of the tailgate.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

This disclosure relates to a vehicle that includes a tailgate, a latch for latching the tailgate, and as part of a power tailgate system, a latch actuator connected with the latch. In relation to the vehicle, this disclosure teaches systems and methods for operating the power tailgate system. According to the systems and methods, the power tailgate system may overload check the tailgate using the latch actuator to come to a determination whether the tailgate is overloaded or not overloaded, and when the tailgate is overloaded, deny requests to automatically open the tailgate.

Figure 1A:
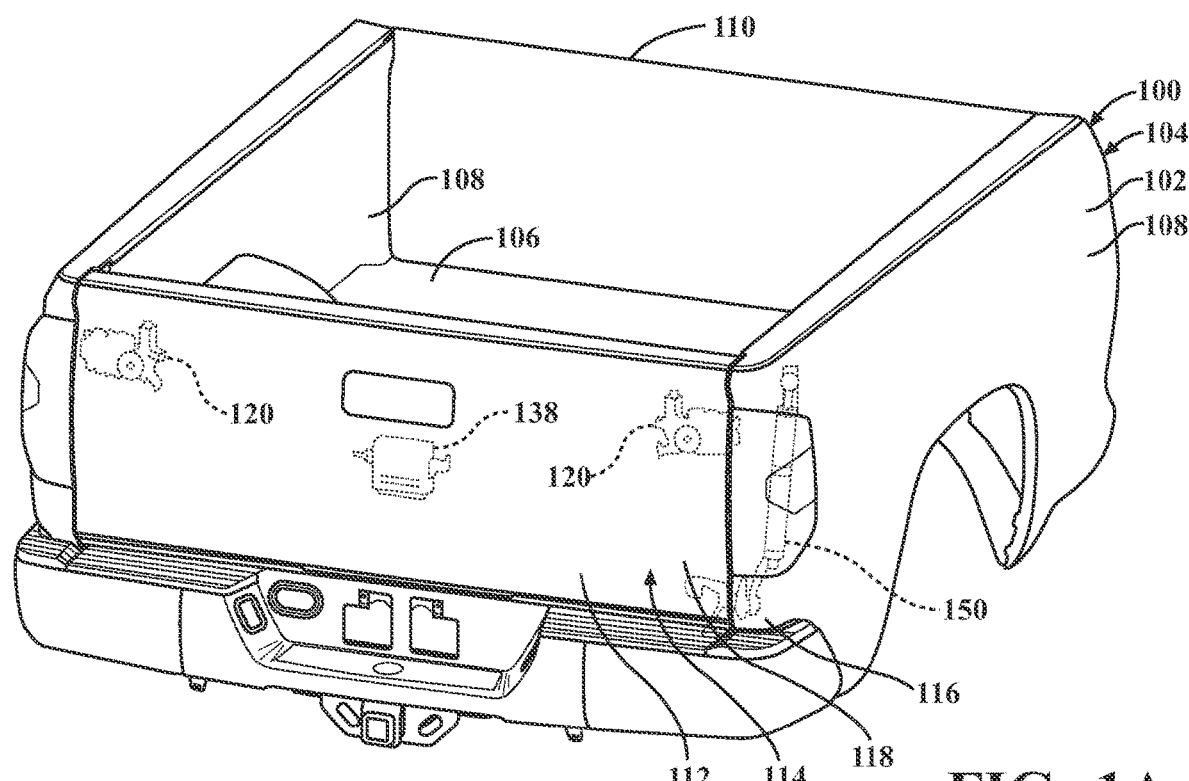
FIGS. 1A and 1B are schematic perspective views of portions of a vehicle including a cargo bed, a tailgate, tailgate-side latch assemblies in accordance with an embodiment described herein that include latches for latching the tailgate, vehicle-side strikers for the latches, a power tailgate system that includes tailgate actuators for the tailgate, and latch actuators for the latch assemblies.

Part of a representative passenger vehicle 100 is shown in FIG. 1A. As shown, the vehicle 100 is a pickup truck. The vehicle 100 includes an exterior and a number of interior compartments. In the illustrated pickup truck configuration of the vehicle 100, the compartments include an open-topped bed 102 for carrying cargo. In addition to the bed 102, the compartments may include a passenger compartment, an engine compartment and the like. Among other things, the vehicle 100 may include seats, a dash assembly, an instrument panel and the like housed in the passenger compartment. In addition, the vehicle 100 may include an engine, a motor, a transmission and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground.

The vehicle 100 includes a body 104 that forms the exterior and defines or otherwise encloses the bed 102 and the other compartments. In relation to the bed 102, the body 104 includes a deck 106, two sides 108, a bulkhead 110 and a rear end 112. At the rear end 112, the body 104 defines a tailgate opening 114. Likewise, the body 104, including but limited to the sides 108, renders surrounding body 116 that frames the tailgate opening 114. The tailgate opening 114 opens between the bed 102 and the exterior. Relatedly, as part of the rear end 112, the body 104 includes a tailgate 118 corresponding to the tailgate opening 114. This description follows with reference to the tailgate 118 in the illustrated pickup truck configuration of the vehicle 100. However, it will be understood that this disclosure is applicable in principle to otherwise similar vehicles whose bodies include tailgates corresponding to tailgate openings that open between their compartments and their exteriors. For instance, this disclosure is applicable in principle to vehicles whose bodies include liftgates corresponding to liftgate openings that open between their cargo compartments and their exteriors.

Figure 1B:
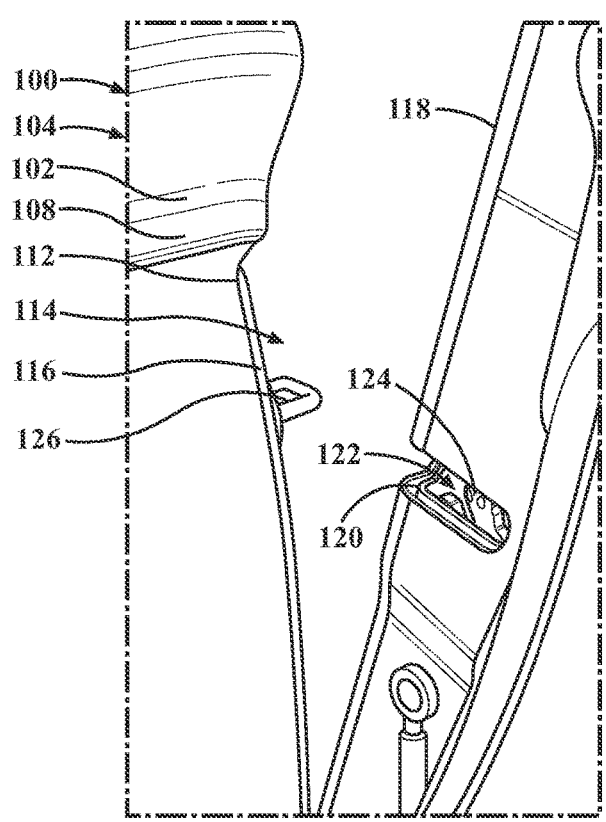

As shown with additional reference to FIG. 1B, the tailgate 118 serves as closure panel for the bed 102. The tailgate 118 is pivotally connected to the surrounding body 116 for movement, relative to the tailgate opening 114, between one or more closed positions and one or more open positions. In FIG. 1A, the tailgate 118 is shown in a representative closed position. In the closed positions, the tailgate 118 is positioned over the tailgate opening 114, with the periphery of the tailgate 118 adjacent the surrounding body 116. In FIG. 1B, the tailgate 118 is shown in a representative open position. In the open positions, the tailgate 118 is positioned away from the tailgate opening 114, which allows access to the bed 102 from the rear of the vehicle 100.

Figure 1C:
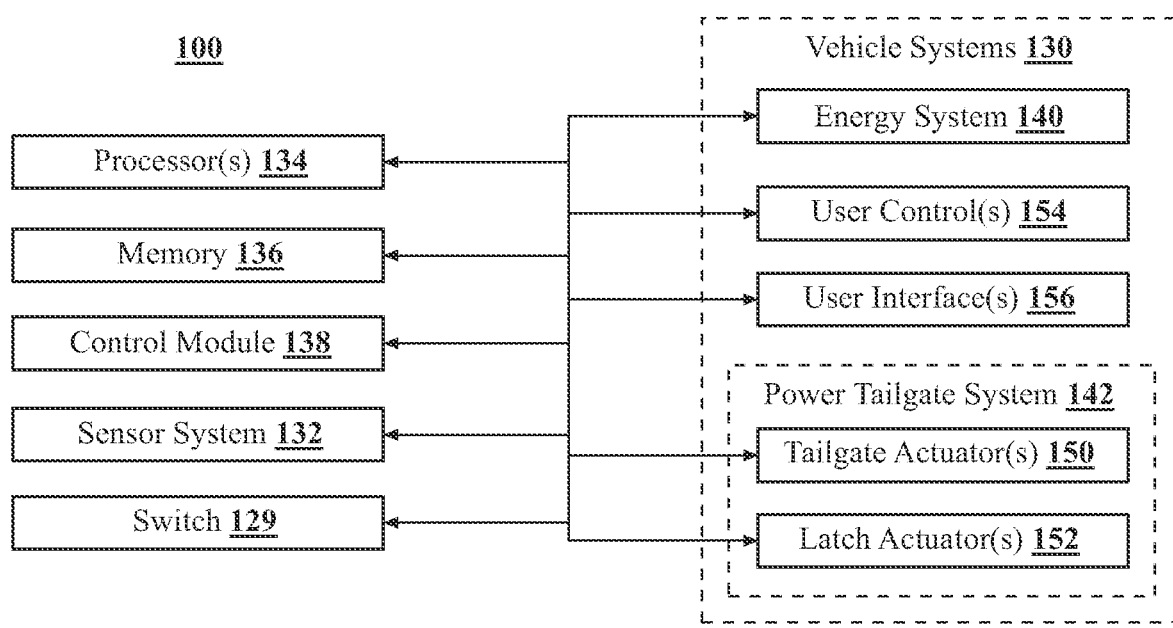
FIG. 1C is a schematic block diagram of a vehicle including a power tailgate system incorporating a powered latch assembly in accordance with an embodiment described herein.

As shown with additional reference to FIG. 1C, the vehicle 100 includes one or more vehicle systems 130 operable to perform vehicle functions. In addition to the vehicle systems 130, the vehicle 100 includes a sensor system 132, as well as one or more processors 134, memory 136, and a control module 138 to which the vehicle systems 130 and the sensor system 132 are communicatively connected. The control module 138 may be housed, in whole or in part, in the tailgate 118. The sensor system 132 is operable to detect information about the vehicle 100. The processors 134, the memory 136 and the control module 138 together serve as a computing device whose control module 138 is employable to orchestrate the operation of the vehicle 100, in whole or in part. Specifically, the control module 138 operates the vehicle systems 130 based on information about the vehicle 100. Accordingly, as a prerequisite to operating the vehicle systems 130, the control module 138 gathers information about the vehicle 100, including the information about the vehicle 100 detected by the sensor system 132. The control module 138 then evaluates the information about the vehicle 100, and operates the vehicle systems 130 based on its evaluation.

The vehicle systems 130 are part of, mounted to, or otherwise supported by the body 104. Each vehicle system 130 includes one or more vehicle elements. On behalf of the vehicle system 130 to which it belongs, each vehicle element is operable to perform, in whole or in part, any combination of vehicle functions with which the vehicle system 130 is associated. It will be understood that the vehicle elements, as well as the vehicle systems 130 to which they belong, may but need not be mutually distinct.

The vehicle systems 130 include an energy system 140 and a power tailgate system 142. The power tailgate system 142 is connected to the energy system 140. Moreover, the power tailgate system 142 is connected to the tailgate 118, and to the latch assemblies 120. The energy system 140 is operable to perform one or more energy functions, including but not limited to storing and otherwise handling electrical energy. The power tailgate system 142 is operable to perform one or more power tailgate functions using electrical energy from the energy system 140, including but not limited to automatically opening the tailgate 118 and automatically closing the tailgate 118.

Among the power tailgate elements of the power tailgate system 142, the vehicle 100 includes one or more tailgate actuators 150 for the tailgate 118. Each tailgate actuator 150 may be housed, in whole or in part, in the surrounding body 116. In one implementation, each tailgate actuator 150 is a motor-driven spindle drive. In this and other implementations, each tailgate actuator 150 is connected to the energy system 140. Moreover, each tailgate actuator 150 is connected with the tailgate 118. The tailgate actuators 150 are operable to open the tailgate 118, close the tailgate 118 and otherwise move the tailgate 118 between the closed positions and the open positions using electrical energy from the energy system 140. Although the vehicle 100, as shown, includes two tailgate actuators 150 in the power tailgate system 142, it will be understood that this disclosure is applicable in principle to otherwise similar vehicles 100 including one or more tailgate actuators 150 in the power tailgate system 142.

Also among the power tailgate elements of the power tailgate system 142, the vehicle 100 includes one or more latch actuators 152 for the latch assemblies 120. Each latch actuator 152 corresponds to a latch assembly 120, and may be housed, in whole or in part, in the tailgate 118. For instance, each latch actuator 152 may be housed in the tailgate 118, and connected to the tailgate 118, as a unitary module with the corresponding latch assembly 120. In one implementation, each latch actuator 152 is a motor-driven reduction drive. In this and other implementations, each latch actuator 152 is connected to the energy system 140. Moreover, each latch actuator 152 is operably connected with the corresponding latch assembly 120 and an associated latch 124. The term "operably connected," as used throughout this description, can include direct or indirect connections, including connections without direct physical contact. Similarly, elements described as being "operably connectible" are elements that can be connected directly (through direct physical contact) or indirectly, through other, physically intermediate element(s). For each corresponding latch assembly 120, latch 124 and latch actuator 152, using electrical energy from the energy system 140, the latch actuator 152 is operable to activate the latch 124 for non-revertible movement in the latching direction, and deactivate the latch 124 for movement in the unlatching direction. Moreover, the latch actuator 152 is operable to disengage the pawl 202 from the latch 124, move the latch 124 in the latching direction, and move the latch 124 in the unlatching direction. In one or more arrangements, the latch may be released or deactivated by disengaging the latch control member 125 from direct physical contact with any element (i.e., in the mechanism shown, the pawl 202 and the latch lever 220) of the control linkage 206 structured to control its motion, so that the latch may be acted on only by the latch control member spring 200. Although the vehicle 100, as shown, includes one latch actuator 152 per latch assembly 120 in the power tailgate system 142, it will be understood that this disclosure is applicable in principle to otherwise similar vehicles 100 including one or more latch actuators 152 per latch assembly 120 in the power tailgate system 142.

The vehicle 100 includes one or more user controls 154 and one or more user interfaces 156 for the power tailgate system 142. In the vehicle 100, the user controls 154 and the user interfaces 156 may be part of an infotainment system typical of vehicles, or dedicated to the power tailgate system 142. The user controls 154 serve as interfaces between users and the vehicle 100 itself, and are operable to receive mechanical, verbal and other user inputs for generating requests. Similarly, the user interfaces 156 serve as interfaces between users and the vehicle 100 itself, and are operable to issue tactile, sound and visual outputs that may be sensed by users. For instance, the vehicle 100 may include one or more onboard or off-board user controls 154 for remotely generating requests to automatically open the tailgate 118 from in the passenger compartment or otherwise away from the tailgate 118 (e.g., an onboard user control 154 in the passenger compartment, an off-board user control 154 located away from the tailgate 118, etc.). For instance, the vehicle 100 may include one or more onboard or off-board user controls 154 for non-remotely generating requests to automatically open the tailgate 118 from the rear of the vehicle 100 or otherwise adjacent the tailgate 118 (e.g., an onboard user control 154 on the rear of the vehicle 100, an off-board user control 154 located adjacent the tailgate 118, etc.).

As part of the sensor system 132, the vehicle 100 includes one or more onboard sensors. The sensors monitor the vehicle 100 in real-time. The sensors, on behalf of the sensor system 132, are operable to detect information about the vehicle 100, including information about the operation of the vehicle 100. Among the sensors, the vehicle 100 includes one or more tailgate sensors, one or more latch sensors, one or more controller area network (CAN) sensors and the like. Relatedly, among information about the operation of the vehicle 100, the sensor system 132 is operable to detect movement of the tailgate 118, the movement of the latches 124, requests to automatically open the tailgate 118, requests to automatically close the tailgate 118, and the operational statuses of one, some or all of the vehicle systems 130, including the energy system 140, the tailgate actuators 150 and the latch actuators 152.

Referring to FIGS. 1A-3B, in relation to opening the tailgate 118 and closing the tailgate 118, the vehicle 100 includes one or more tailgate-side latch assemblies 120. Each latch assembly 120 includes a striker chute 122, and a corresponding latch 124 for latching the tailgate 118. Relatedly, the vehicle 100 includes one or more vehicle-side strikers 126 corresponding to the striker chutes 122 and the latches 124. Each latch assembly 120 is connected to the tailgate 118. Each latch assembly 120 may be housed, in whole or in part, in the tailgate 118. For instance, each latch assembly 120 may be housed in the tailgate 118, and connected to the tailgate 118, as a unitary module. Each striker 126 is connected to the surrounding body 116. Although the vehicle 100, as shown, includes two latch assemblies 120 and two strikers 126, it will be understood that this disclosure is applicable in principle to otherwise similar vehicles 100 including one or more latch assemblies 120 and one or more strikers 126.

Each latch assembly 120 includes one or more latch components, including but not limited to the striker chute 122 and the latch 124. The latch components are connected within the latch assembly 120, and equally, connected within the tailgate 118. From within the latch assembly 120, and equally, from within the tailgate 118, some of the latch components, including but not limited to the striker chute 122, may be immovable. These latch components are not only immovable relative to one another, but also immovable relative to the latch assembly 120, and equally, immovable relative to the tailgate 118. In addition, some of the latch components, including but not limited to the latch 124, may be movable. These latch components are not only movable relative to one another, but also movable relative to the latch assembly 120, and equally, movable relative to the tailgate 118. In any event, all of the latch components, including but not limited to the striker chute 122 and the latch 124, are co-movable with the latch assembly 120, and equally, co-movable with the tailgate 118. With respect to the movement of the latch components, this description follows with reference to the perspective of the tailgate 118. However, it will be understood that this disclosure is applicable in principle to the perspective of the latch assembly 120.

For each corresponding striker chute 122, latch 124 and striker 126, the striker chute 122 opens to the tailgate 118 for passing the striker 126 into and out of the tailgate 118. The latch 124 is movable, relative to the striker chute 122, in a latching direction EE (FIG. 3B) and in an unlatching direction AA between one or more unlatching positions and one or more latching positions. In FIGS. 1B and 3A-3C, the latch 124 is shown in a representative unlatching position. In the unlatching positions, the latch 124 aligns with the striker chute 122 for passing the striker 126 into and out of the tailgate 118. In the latching positions, the latch 124 crosses the striker chute 122 for capturing the striker 126 within the tailgate 118. Accordingly, the latch 124 latches the tailgate 118 to the surrounding body 116 against the striker 126.

The latch 124 may be activated for non-revertible movement in the latching direction EE. When the tailgate 118 is being closed, the latch 124 functions as the tailgate 118 is moved to the closed positions, and afterward, when the tailgate 118 is in the closed positions. With the tailgate 118 in the open positions, the latch 124, having previously unlatched the tailgate 118, is in an unlatching position. To close the tailgate 118, the latch 124 is activated for non-revertible movement in the latching direction. As the tailgate 118 is moved to the closed positions, the striker 126 passes into the tailgate 118 through the striker chute 122. The latch 124 may include a slot 124b structured to receive therein an associated striker 126 mounted on the vehicle, to engage the striker so as to secure the tailgate 118 in a closed position. As it passes into the tailgate 118, the striker 126 moves the latch 124 in the latching direction to a latching position, and the latch 124, unable to move in the unlatching direction to an unlatching position, latches the tailgate 118 to the surrounding body 116 against the striker 126.

In addition, the latch 124 may be deactivated for movement in the unlatching direction. When the tailgate 118 is being opened, the latch 124 functions as the tailgate 118 is moved to the open positions. With the tailgate 118 in the closed positions, the latch 124, having previously latched the tailgate 118, is in a latching position. To open the tailgate 118, the latch 124 is deactivated for movement in the unlatching direction. As the tailgate 118 is moved to the open positions, the striker 126 passes out of the tailgate 118 through the striker chute 122. As it passes out of the tailgate 118, the striker 126, in combination with a bias of the latch 124 for movement in the unlatching direction, moves the latch 124 in the unlatching direction AA to an unlatching position, and the latch 124 unlatches the tailgate 118 from the surrounding body 116 from against the striker 126.

Figure 3A:
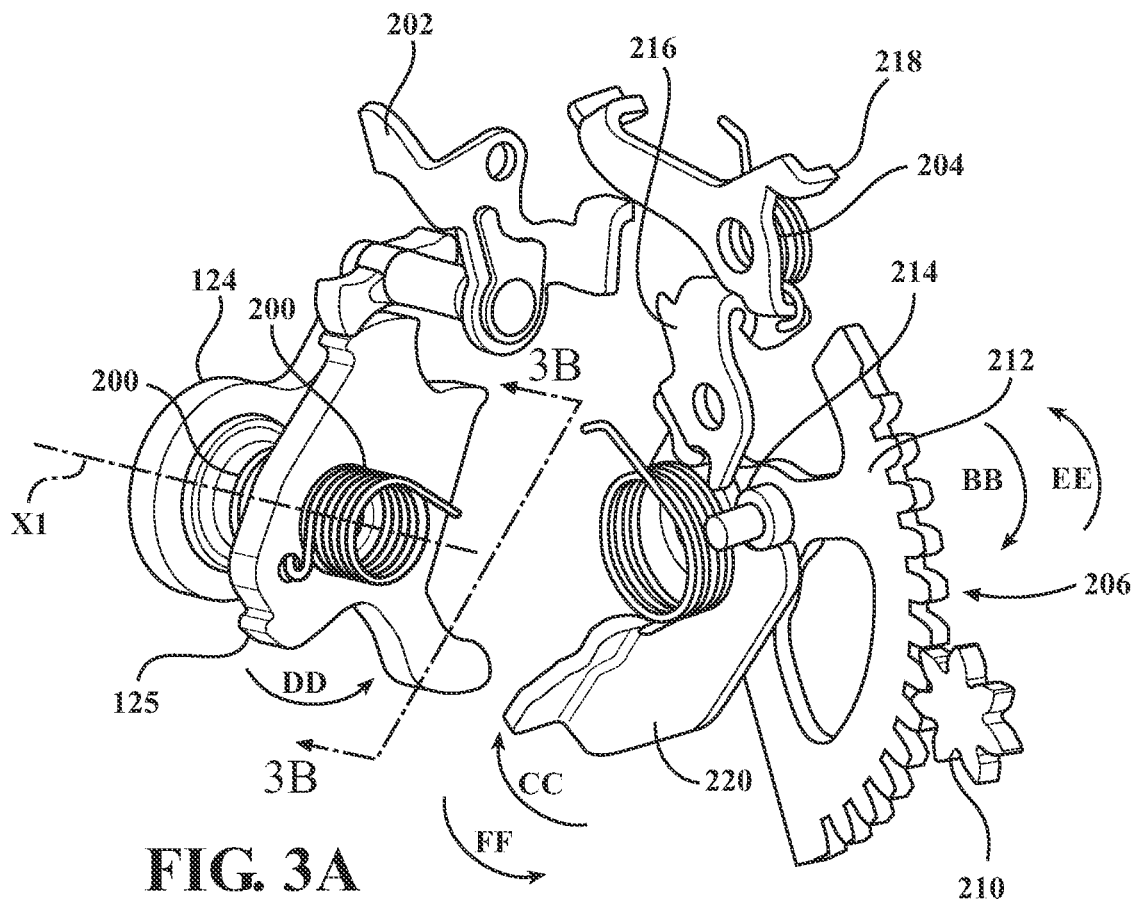
FIG. 3A is a schematic perspective view of the operating components and mechanism of a latch assembly in accordance with an embodiment described herein.
Figure 3B:
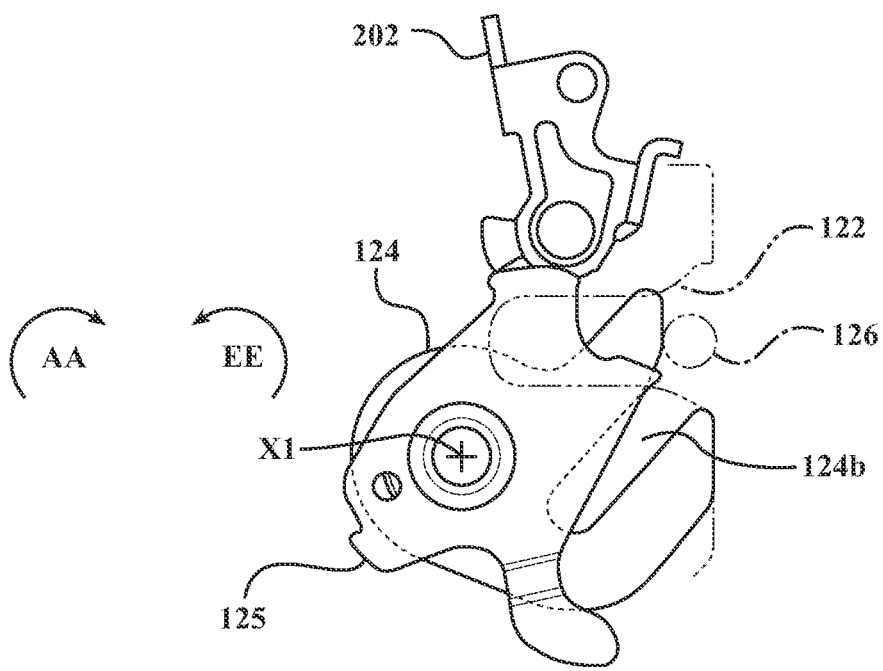
FIG. 3B is a schematic side view of a portion of the latch assembly of FIG. 3A.

A representative latch assembly 120, with a cover 301 (described in greater detail below) removed to better view movable latch components, is shown in FIGS. 3A and 3B. As shown, the latch assembly 120 is rendered by shaft-supported rotary latch components. Various components of the latch assembly may be rotatably mounted to any portion or structure of the latch assembly enabling the relative positional arrangements of the components and the functional arrangements between the components as described herein to be maintained during operation of the latch assembly.

As shown with reference to a phantom rendering of the striker chute 122 shown in FIG. 3B, among the movable latch components of the latch assembly 120, the tailgate 118 includes the latch 124, as noted above, as well as a latch spring 200 for exerting a biasing force on the latch 124 in the direction indicated by arrow AA in FIG. 3B. Latch 124 may be structured to engage striker 126 and to be rotatable into a latching position when engaged with the striker, so as to maintain the tailgate in a closed position of the tailgate associated with the latching position of the latch.

The latch assembly may include a latch control member 125 rotationally connected to the latch 124 and structured to be engageable by a pawl 202 of the latch assembly to maintain the latch control member 125 in a position associated with a latching position of the latch 124. "Rotationally connected" means that the latch control member 125 and the latch 124 are connected so as to rotate in correspondence with each other (e.g., a rotation of the latch control member 30° in a first direction will produce an associated rotation of the latch 30° in the first direction, and vice versa).

The latch control member 125 may be biased for rotation in direction AA (i.e., in the unlatching direction of the latch 124) by associated biasing spring 200. When the latch control member 125 is engaged by the pawl 202, the latch control member 125 is prevented from rotating in the opening direction of the latch (i.e., direction AA as shown in FIGS. 3A and 3B). As mounted in the latch assembly 120, the latch control member 125 may be cooperatively structured, oriented, and rotationally connected with respect to the latch 124 so that latch control member 125 features engageable by the pawl 202 correspond to associated latching positions of the latch 124. By this structure, each latching position of the latch 124 may be maintained by the pawl 202 engaging an associated feature on the latch control member 125 during rotation of the latch control member 125 and latch. Similarly, rotation of the pawl 202 out of engagement with the latch control member 125 may release the latch control member 125 (and the rotationally-attached latch 124) for rotation in unlatching direction AA responsive to the biasing force exerted by the latch control member spring 200.

In one or more arrangements, the latch control member 125 may be formed as a separate piece from the latch 124. In one or more arrangements, the latch control member 125 may be mounted in the latch assembly so that the rotational axis of the latch control member 125 is coaxial with the rotational axis of the latch, and so that the latch is axially spaced apart from the latch control member 125 along the common rotational axis X1. Thus, because the latch control member 125 and latch 124 are coaxially mounted, the latch control member 125 is coaxially rotationally connected to the latch 124 and structured to be engageable by the pawl 202 of the latch assembly to maintain the latch control member 125 in a position associated with the latching position of the latch 124.

Pawl 202 may be mounted in the latch assembly 120 so as to be rotatable with respect to the latch control member 125. A pawl spring 204 may exert a rotational force on the pawl 202 in a direction DD biasing the pawl toward contact with the latch control member 125. The pawl 202 may be structured and positioned to prevent rotation of the latch control member 125 in direction AA (i.e., the unlatching direction of the latch 124) when the pawl 202 is in contact with the latch control member 125. As described above, the contact between the pawl 202 and the latch control member 125 may also maintain the rotationally connected latch 124 in the half-latched and fully-latched positions described herein.

The latch assembly 120 may also include a control linkage 206 structured for controlling rotation of the pawl 202 and latch control member 125. The control linkage 206 may include a sector gear 212 having a drive pin 214 extending therefrom at a fixed location so as to rotate with the sector gear. The sector gear 212 may be structured and positioned so that rotation of the sector gear in direction BB causes the drive pin 214 to engage the latch lever 220, thereby producing a rotation of the latch lever in direction BB. The sector gear 212 may also be structured and positioned so that rotation of the sector gear in a direction EE opposite the direction BB causes the drive pin 214 to engage the pawl crank 216, thereby producing a rotation of the pawl crank in direction BB. The sector gear 212 is engaged with, and rotatable by, a pinion gear 210 coupled to an associated latch actuator 152 for powering the latch assembly 120.

The control linkage 206 may also include latch lever 220 mounted in the latch assembly so as to be rotatable with respect to the sector gear 212. The latch lever 220 may fully control member 125 in direction DD. The latch lever 220 may also be rotated in direction FF to disengage from the latch control member 125.

The control linkage 206 may also include the pawl crank 216, which may be structured and positioned so as to be rotatable with respect to the sector gear 212. When the pawl crank 216 is rotated in direction BB by contact with the rotating drive pin (rotating in direction EE), the pawl crank 216 may engage the pawl lever 218 to rotate the pawl lever in direction EE.

The control linkage 34 may also include the pawl lever 218 structured and positioned to be rotatable to engage the pawl 202. Rotation of the pawl lever 218 may be biased in the direction BB by an associated pawl lever spring 204. Rotation of the pawl lever 218 in direction EE may produce a rotation of the pawl 202 in direction AA so as to disengage the pawl from the latch control member 125, thereby allowing the latch control member 125 to rotate in direction AA to an unlatching position responsive to a force exerted by the latch control member 125 biasing spring 200.

In FIGS. 3A and 3B, the latch 124 is shown in a representative unlatching position. The latch control member 125 is biased, by the latch control member spring 200, for movement in the unlatching direction. The pawl 202 is biased, by the pawl spring 204, for engagement with the latch control member 125. In FIGS. 3A and 3B, the pawl 202 is shown engaging the latch control member 125. When the pawl 202 engages the latch control member 125, the latch 124 rotationally connected to the latch control member 125 is non-revertibly movable in the latching direction (i.e., the latch is only permitted to move in the latching direction). When the pawl 202 disengages from the latch control member 125 (i.e., when the pawl is rotated so as to be out of physical contact with the latch control member 125), the attached latch control member 125 and latch 124 are rotatable in the unlatching direction AA under influence of the latch control member spring. Accordingly, in a normally-activated configuration, the pawl 202 normally engages the latch control member 125, and with the pawl 202 normally engaging the latch control member 125, the latch 124 is normally activated for non-revertible movement in the latching direction. Likewise, the latch 124 is deactivated for movement in the unlatching direction (responsive to the biasing force exerted by latch control member spring 200) when the pawl 202 is disengaged from the latch control member 125.

The corresponding latch actuator 152 for the latch 124 is connected with the control linkage 206 through the pinion gear 210. The latch actuator 152 is operable to drive the control linkage 206 using electrical energy from the energy system 140.

As shown, the control linkage 206 includes a pinion gear 210 meshed with the sector gear 212. The latch actuator 152 is connected with the control linkage 206 at the pinion gear 210, and is operable to drive the control linkage 206 through the pinion gear 210 using electrical energy from the energy system 140.

In FIGS. 3A and 3B, the control linkage 206 is shown idled after having been driven by the latch actuator 152 to disengage the pawl 202 and disengage the latch 124. Through the pinion gear 210, the sector gear 212, the drive pin 214, the pawl crank 216 and the pawl lever 218, the control linkage 206 is drivable by the latch actuator 152 by moving the pinion gear 210 in the direction indicated by arrow BB until the pawl lever 218 disengages the pawl 202 from the latch control member 125, and thereafter, in the direction EE opposite direction BB until the pawl lever 218 disengages from the pawl 202.

Alternatively, through the pinion gear 210, the sector gear 212, the drive pin 214 and the latch lever 220, the control linkage 206 is drivable by the latch actuator 152 by moving the pinion gear 210 in the direction indicated by arrow EE until the latch lever 220 moves the latch 124 in the latching direction, and thereafter, in the direction indicated by arrow BB until the latch lever 220 disengages from the latch 124 after moving the latch 124 in the latching direction.

Figure 2B:
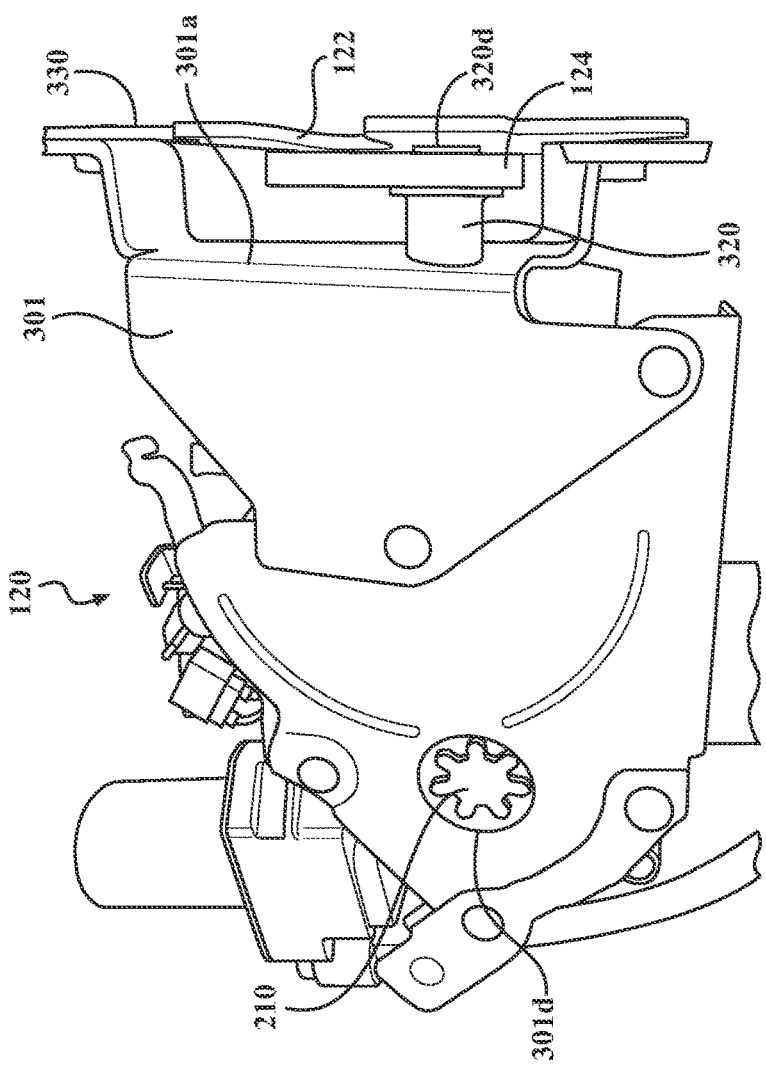
FIG. 2B is a schematic side view of the latch assembly embodiment shown in FIG. 2A.
Figure 2A:
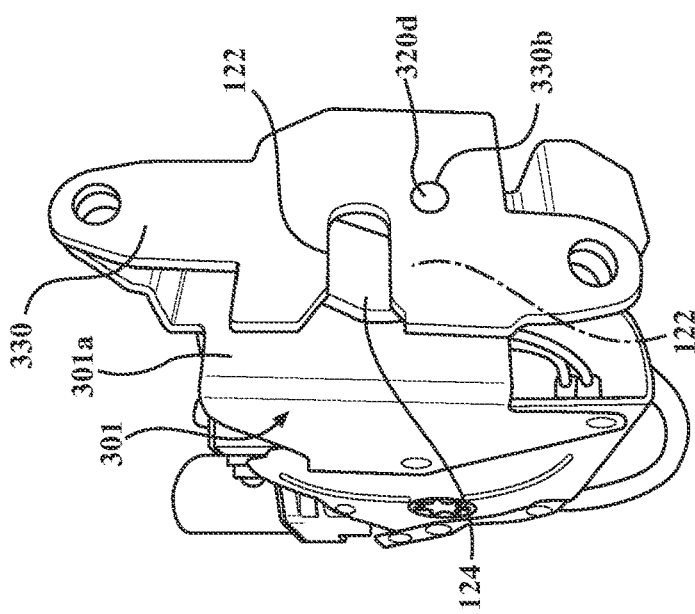
FIG. 2A is a schematic perspective view of a latch assembly in accordance with an embodiment described herein, including a cover structured for protecting operating components of the latch assembly from contaminants.
Figure 3C:
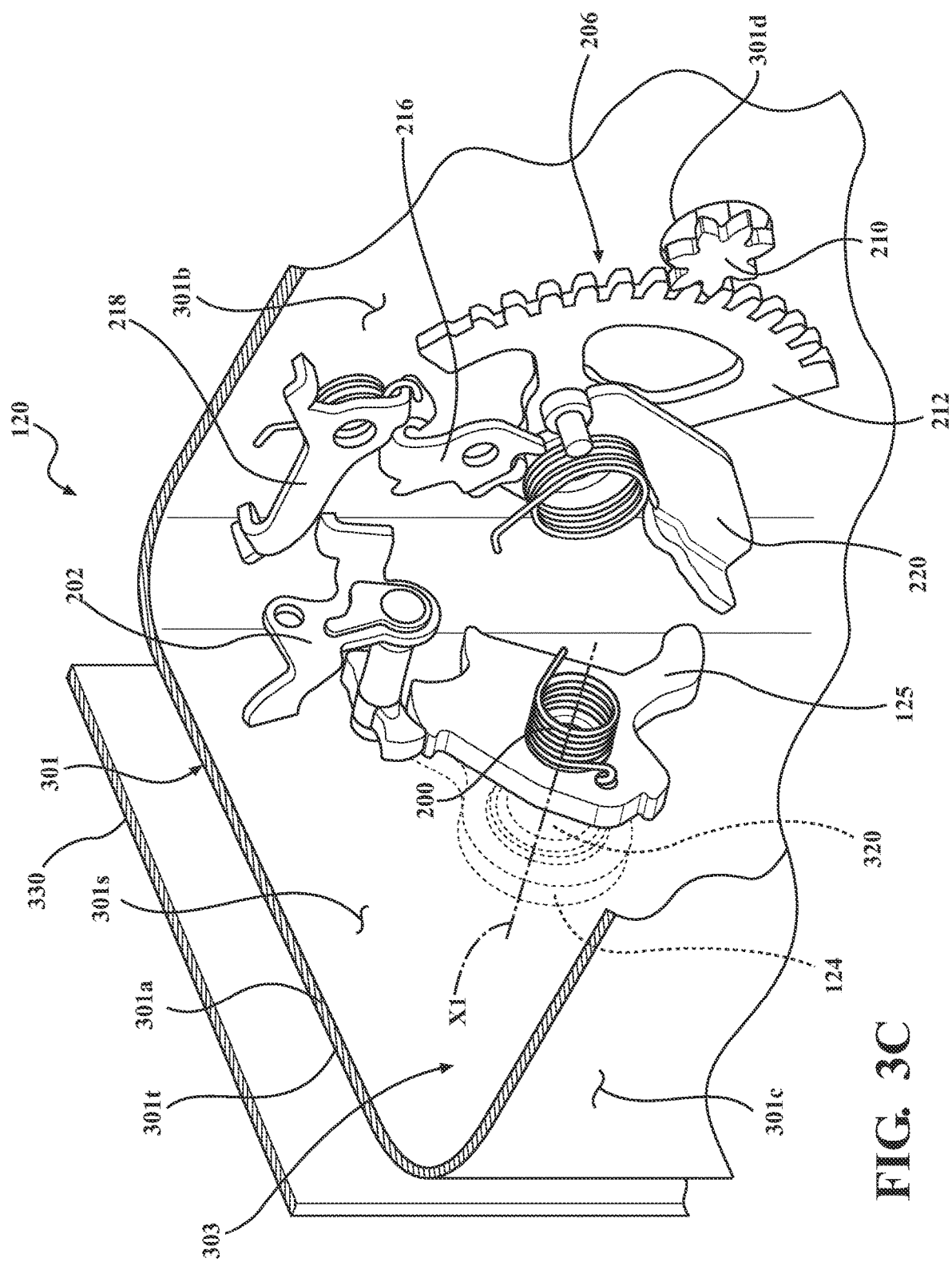
FIG. 3C is a schematic perspective view of the components and mechanism in FIG. 3A shown mounted in a cover (with a portion of the cover partially cut away) structured to environmentally isolate the latch from the other components.

Referring to FIGS. 2A, 2B, and 3C, in one or more arrangements, the latch assembly 120 may include a cover 301 having a first wall 301a. The first wall 301a may serve to physically isolate and environmentally separate the latch 124 from a space in which other elements of the latch mechanism (such as the control linkage 206 and the pawl 202) are positioned, thereby preventing contaminants from reaching elements of the latch mechanism other than the latch. To this end, in one or more arrangements, the control linkage 206 may be mounted in the latch assembly 120 so that the control linkage resides along a first side 301s of the first wall 301a in a position where the control linkage 206 is operably engageable with the pawl 202. A component or group of components is considered to be "operably engageable" with another component or group of components when at least one component of the component/group of components is structured and positioned so as enable physical contact between the two components or groups of components for performing the latching and unlatching operations described herein. The pawl 202 and the control linkage 206 may also be mounted in the latch assembly 120 so that the pawl resides along a first side 301s of the first wall 301a of the cover 301. In addition, the latch control member 215 may be mounted in the latch assembly 120 so that the latch control member resides along the first side 301s of the first wall 301a in a position where the latch control member 125 is operably engageable with the pawl 202 and the control linkage 206. The latch 124 may be rotationally connected to the latch control member 125 through an opening provided in the first wall 301a as described herein, with the latch 124 being positioned along a second side 301t of the first wall 301a opposite the first side 301s of the first wall.

Referring to FIGS. 3A-3C, in one or more particular arrangements, the cover 301 may define an enclosure 303 structured for mounting therein various components of the latch assembly. In particular arrangements, the first wall 301a may be part of the enclosure 303. Thus, the enclosure 303 may be bounded along a side thereof by the first wall 301a. In one or more arrangements, the cover 301 may include a second wall 301b connected to the first wall 301a. In one or more arrangements, the cover 301 may also include a third wall 301c connected to the first wall 301a and positioned opposite the second wall 301b. In combination, the first, second, and third walls (and also portion(s) of one or more additional walls and/or portions of other latch assembly components) may define boundaries of the enclosure 303.

In one or more arrangements, the latch control member 125 may be mounted in the latch assembly 120 so as to reside inside the enclosure 303. In one or more arrangements, as seen in FIG. 3C, the control linkage 206 and the pawl 202 may also be mounted in the latch assembly 120 so as to reside within the enclosure 303. Also, as seen in FIGS. 2B and 3C, the second wall 301b may have an opening 301d enabling access from an exterior of the enclosure to the pinion gear 210, so that an associated latch actuator 152 may engage the pinion gear 210 to power the latch assembly.

Figure 4:
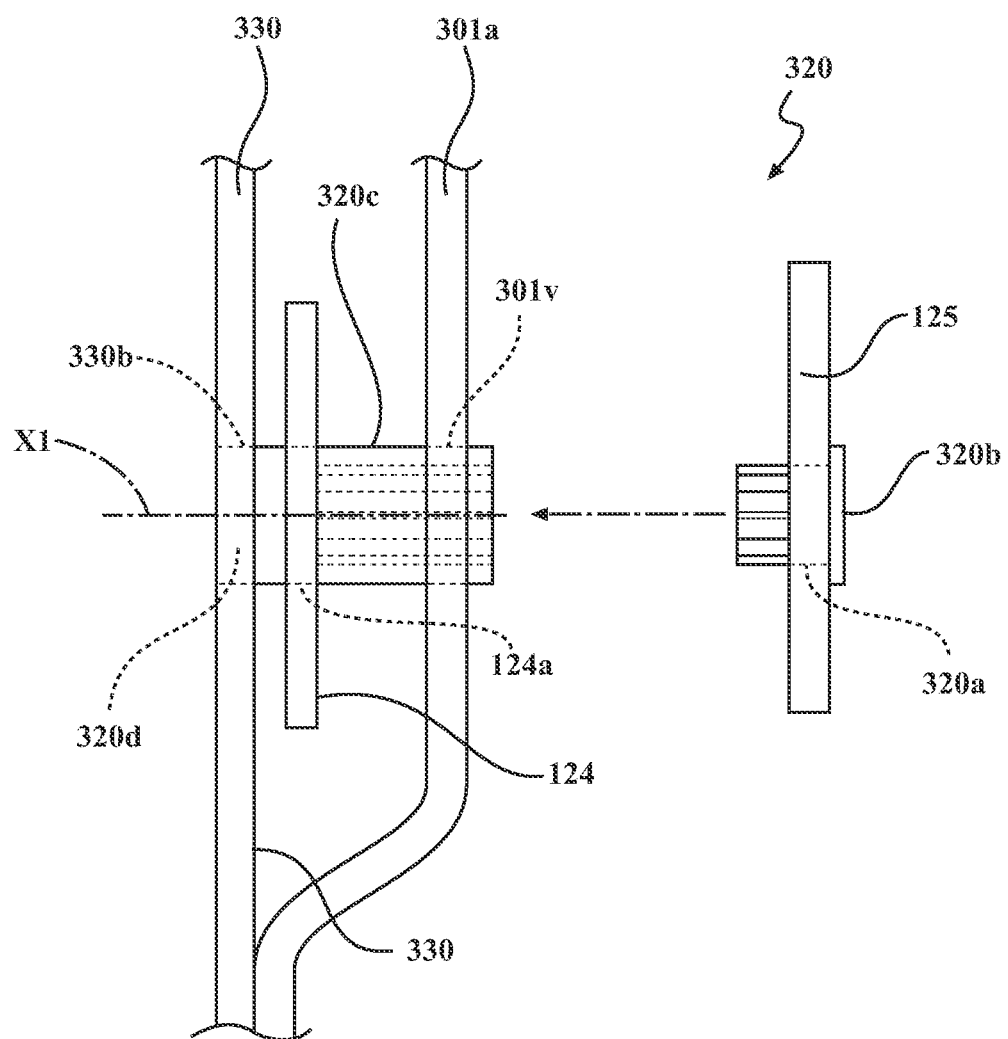
FIG. 4 is a schematic plan view of a connecting structure in accordance with an embodiment described herein, usable for connecting a latch of the latch assembly to a latch control member of the latch assembly.

In one or more arrangements, the latch control member 125 may be mounted in the latch assembly 120 along a first side 301s of the first wall 301a and the latch 124 may be mounted in the latch assembly 120 along a second side 301t of the first wall 301a opposite the first side 301s. Referring to FIGS. 3C and 4, a connecting structure 320 may extend through the cover first wall 301a to rotationally connect the latch control member 125 and latch 124. In one or more arrangements, the connecting structure 320 may include an internally-splined hole 320a formed enclosing a rotational axis X1 of the latch control member 125. An externally-splined bushing 320b may have splines structured for complementary engagement with the internal splines of latch control member hole 320a. The bushing 320b may be received in the hole 320a and may be secured in the hole using an interference fit, a fastener, welding, or by any other suitable method.

The connecting structure 320 may also include an internally-splined bushing 320c having internal splines structured for complementary engagement with the external splines of the bushing 320b. The bushing 320c may be structured to extend through a hole 124a formed in the latch 124 and also through a hole 301v formed in first wall 310a. The hole 301v and the bushing 320c may be dimensioned so as to form a close sliding fit between the bushing and the first wall, to allow rotation of the bushing with respect to the first wall while also preventing moisture, dirt, and other contaminants from passing through the hole from the second side of the first wall to the first side of the first wall where the contaminants may interfere with operation of the latch assembly or damage latch assembly components.

In one or more arrangements, the cover 301 may also include a support wall 330 connected to the first wall 301a and spaced apart from the first wall. As seen in the drawings, the latch 124 may be positioned between the first wall 301a and the support wall 330 when the latch 124 is mounted in the latch assembly. The support wall 330 may include a striker chute 122 formed therein and configured for receiving the striker 126 during operation of the latch assembly. Referring to FIGS. 2A, 2B, and 4 the latch 124 in the space between the first wall 301a and the support wall 330 may be exposed to contaminants from the vehicle exterior environment entering the striker chute 122.

In one or more arrangements, an end 320d of the latch bushing 320c may extend through the hole 124a in the latch 124 and may be rotatably secured in a hole 330b formed in the support wall. The support wall 330 may be firmly positionally fixed with respect to the first wall 301a so that the support wall 330 may be used to help rotatably support the latch 124 and connecting structure 320 against forces exerted on the latch 124 by the striker 126 during operation of the latch assembly.

Figure 8A:
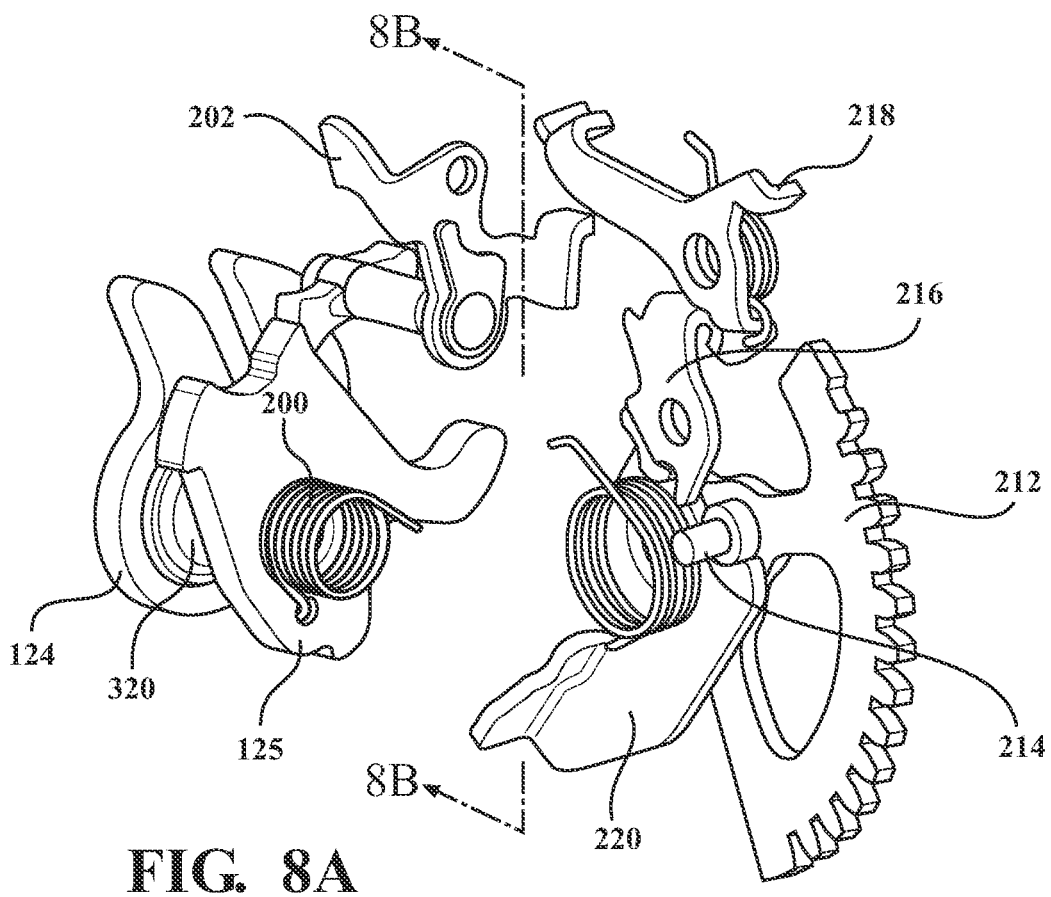
FIGS. 8A and 8B are views of the latch assembly mechanism similar to the views shown in FIGS. 7A and 7B, showing a configuration of the latch assembly when the latch is in a fully-latched position engaging the tailgate striker to maintain the tailgate in a fully-closed position, and the sector gear, pawl crank, pawl lever, and latch lever are in respective idle positions prior to moving of the latch to an over-stroke position.
Figure 8B:
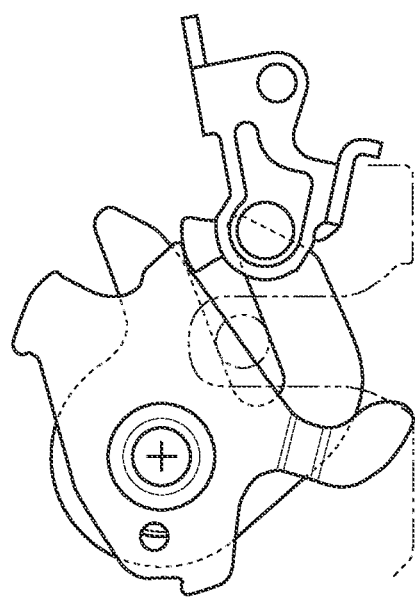
Figure 9A:
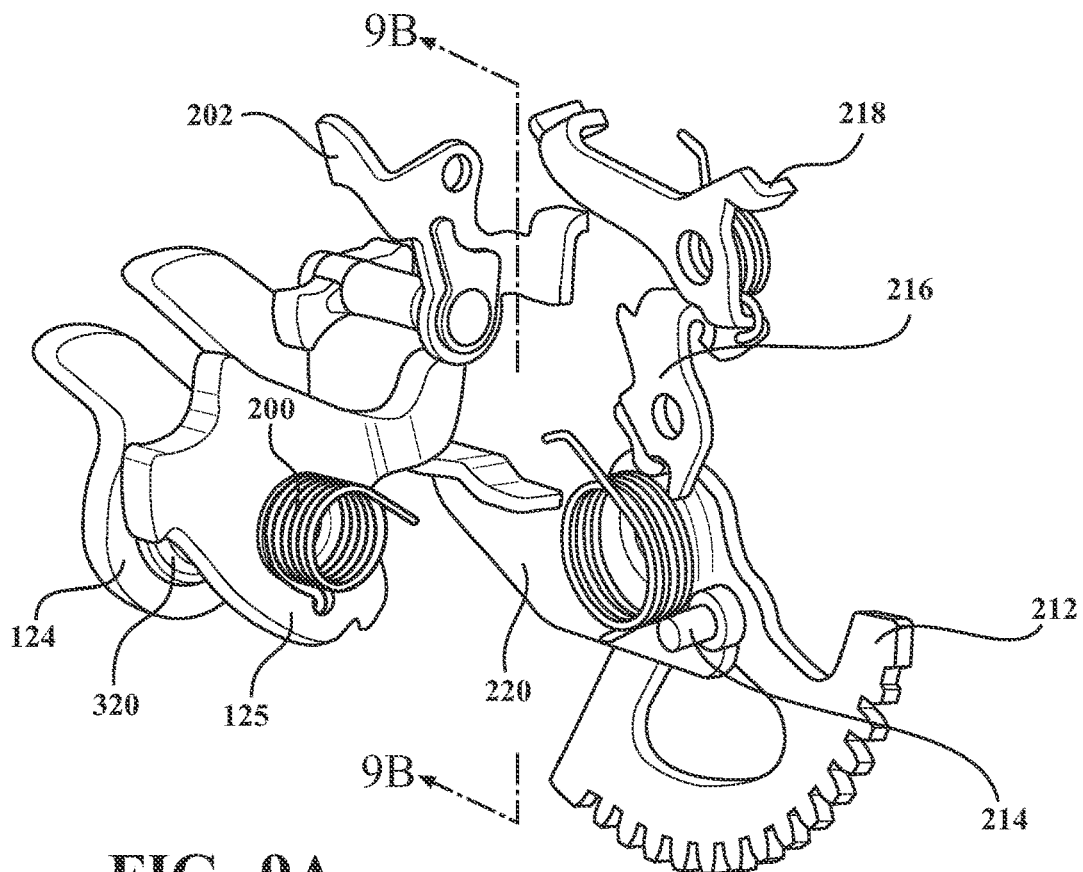
FIGS. 9A and 9B are views of the latch assembly mechanism similar to the views shown in FIGS. 8A and 8B, showing a configuration of the latch assembly when the latch is in an over-stroke position engaging the tailgate striker to maintain the tailgate in an over-closed position.
Figure 9B:
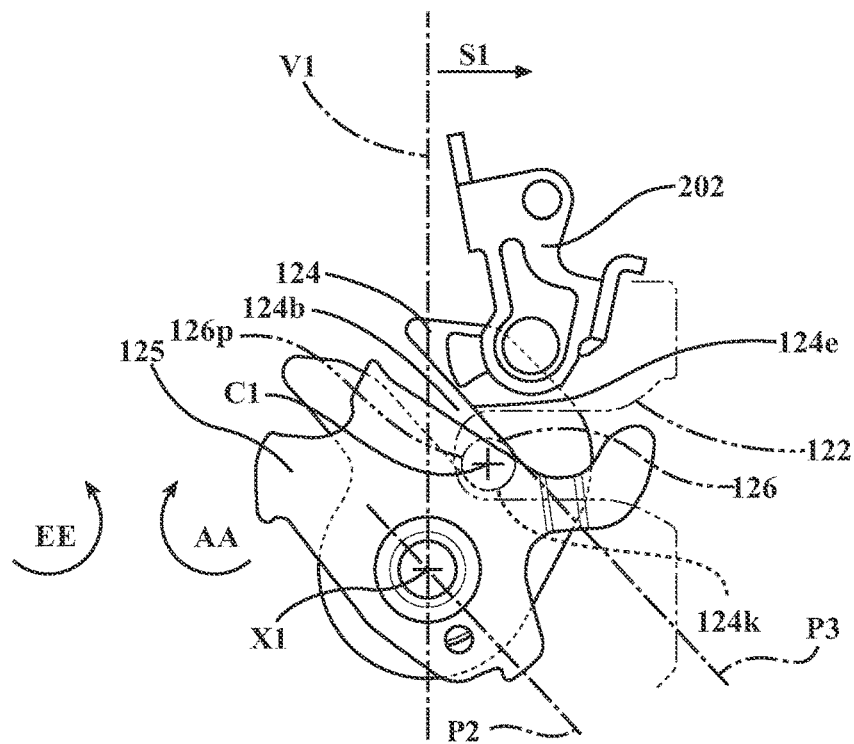
Figure 10A:
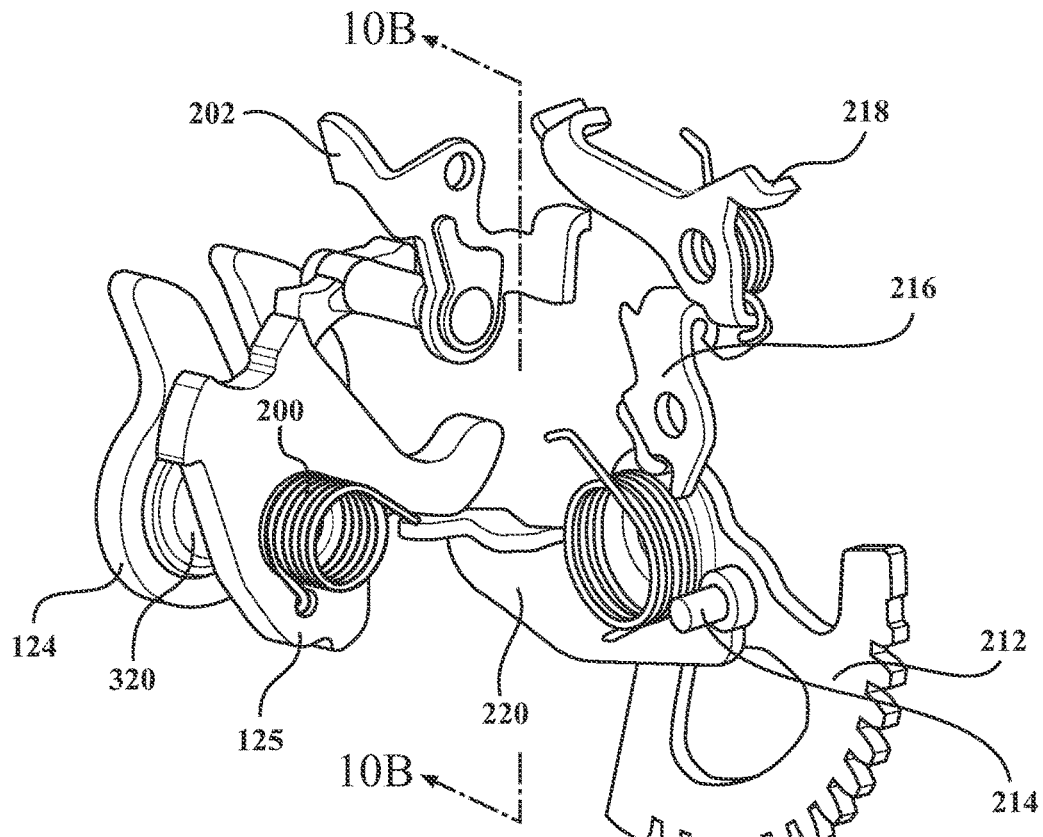
FIGS. 10A and 10B are the views of the latch assembly mechanism in FIGS. 8A and 8B after the latch has returned from the over-stroke position of FIGS. 9A-9B to the fully-latched position.
Figure 10B:
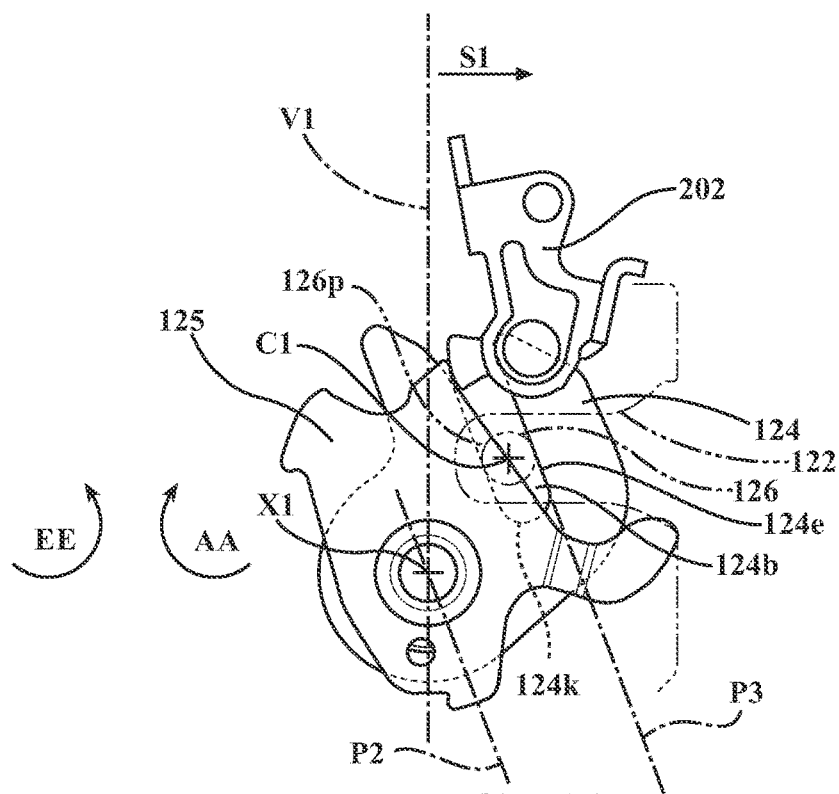
Figure 11A:
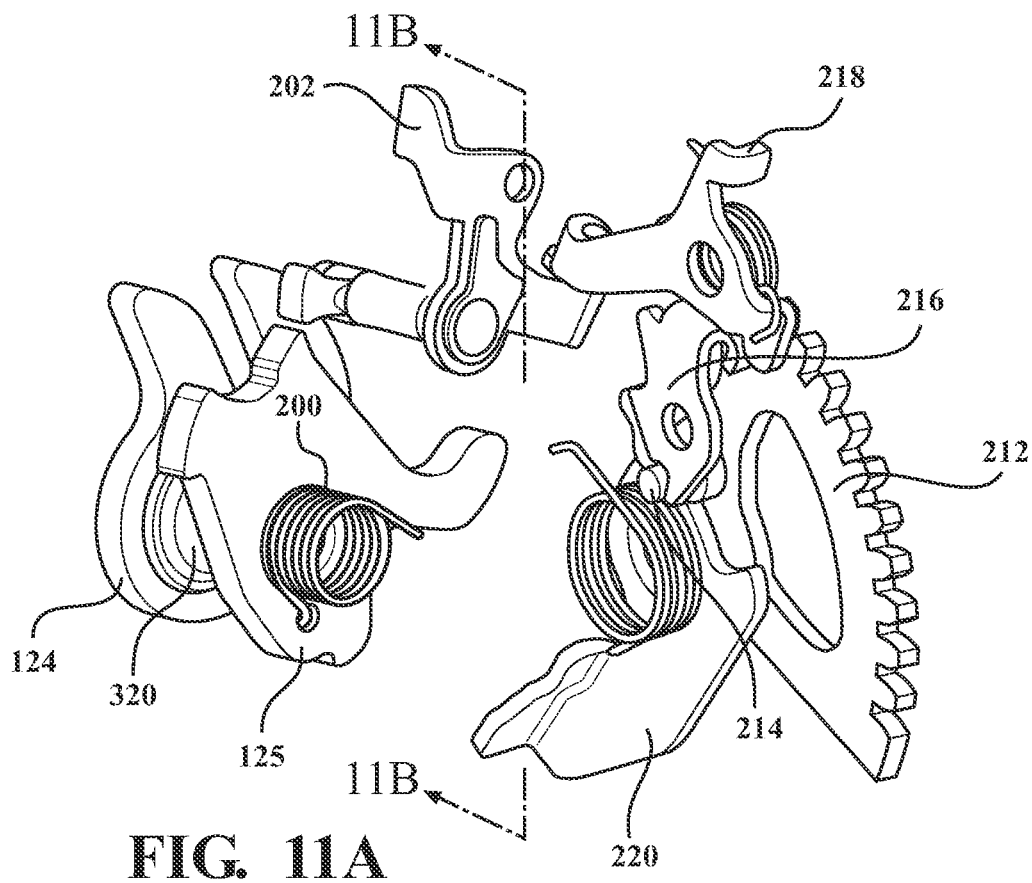
FIGS. 11A and 11B are views of the latch assembly mechanism similar to the views shown in FIGS. 8A and 8B, but showing a configuration of the latch assembly after a pawl of the latch assembly has been disengaged from a latch control member of the latch assembly responsive to a tailgate opening command, thereby releasing the latch to rotate in an unlatching direction.
Figure 11B:
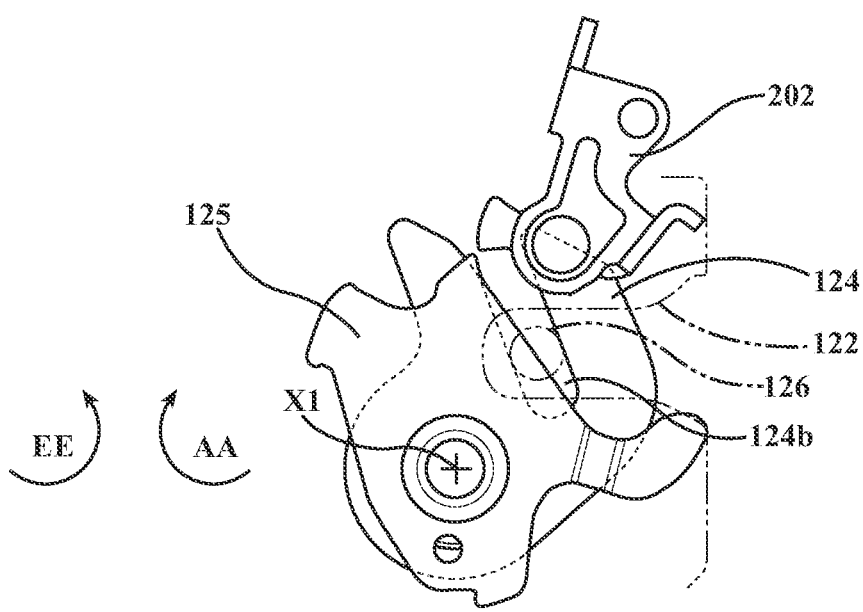
Figure 12A:
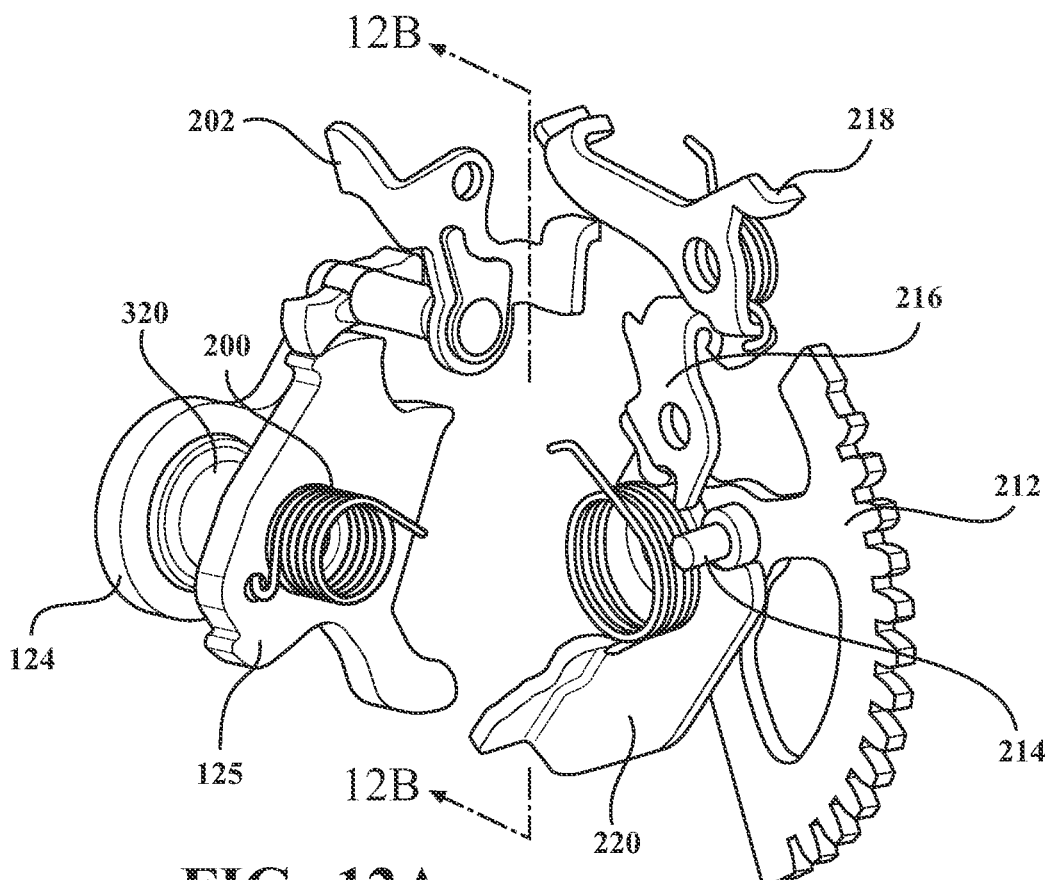
FIGS. 12A and 12B are views of the latch assembly mechanism similar to the views shown in FIGS. 5A and 5B, showing the latch assembly mechanism after returning to the idle configuration after the latch has been released and the tailgate has been opened.
Figure 12B:
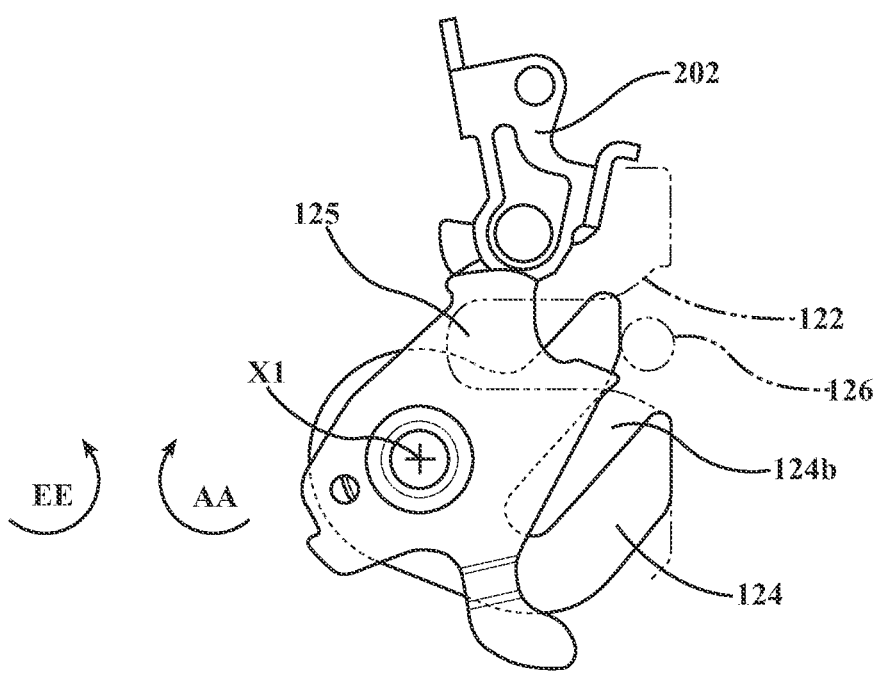

FIGS. 5A-12B show a progression of configurations of the latch assembly during various stages of operation, proceeding starting from an open position of the tailgate (FIGS. 5A-5B) to a fully-closed condition of the tailgate (FIGS. 8A-8B) and then to an over-closed position of the tailgate in which the latch is over-stroked (FIGS. 9A-9B), then proceeding back to the closed tailgate/fully-latched position (FIGS. 10A-10B). After this, the latch control member 125 may be released from contact with the pawl (FIGS. 11A-11B) to enable the latch 124 to rotate to an open position as the tailgate opens (FIGS. 12A-12B).

During operation, the control module 138 gathers information about the vehicle 100 for evaluation, including the movement of the tailgate 118, the movement of the latch 124, requests to automatically open the tailgate 118, requests to automatically close the tailgate 118, the operational statuses of the energy system 140, the tailgate actuator 150 and the latch actuator 152, and other information about the vehicle 100 detected by the sensor system 132. For instance, with respect to the movement of the latch 124, the control module 138 monitors for and identifies unlatching events indicating movement of the latch 124 to the unlatching position. Likewise, the control module 138 monitors for and identifies half-latched events and fully-latched events indicating movement of the latch 124 to the half-latched position and to the fully-latched position. The control module 138 may also monitor for and identify an over-closed position of the tailgate indicating movement of the match to an over-stroke position as described herein. For instance, with respect to the operational statuses of the energy system 140 and the latch actuator 152, the control module 138 monitors for and identifies the load on the latch actuator 152, such as the electrical energy drawn by the latch actuator 152 from the energy system 140, the speed of the latch actuator 152 and the like, associated with the operation of the latch actuator 152.

Referring now to FIGS. 5A-7B, a process of closing and latching the tailgate will be described.

Figure 5A:
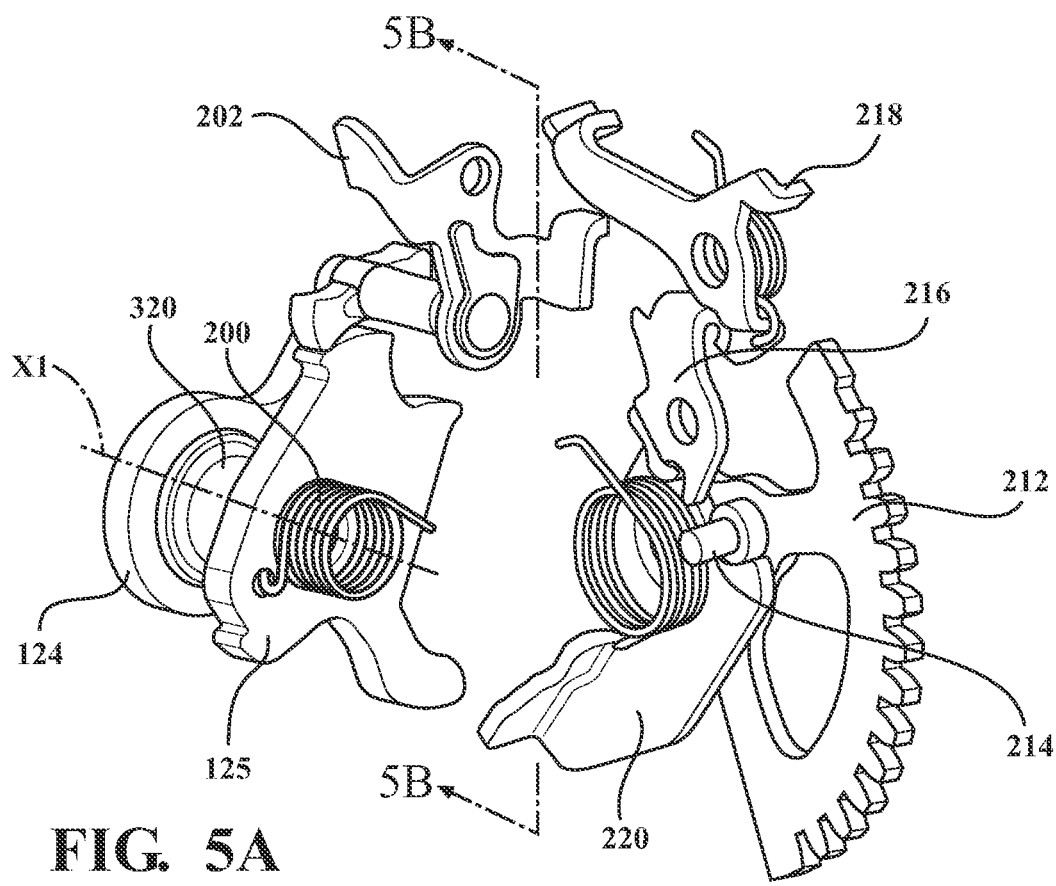
FIGS. 5A and 5B are the views of the latch assembly mechanism of the latch assembly shown in FIGS. 3A and 3B, which represents the latch assembly in an idle configuration when the tailgate is open and the latch is not in contact with a striker of the tailgate.
Figure 5B:
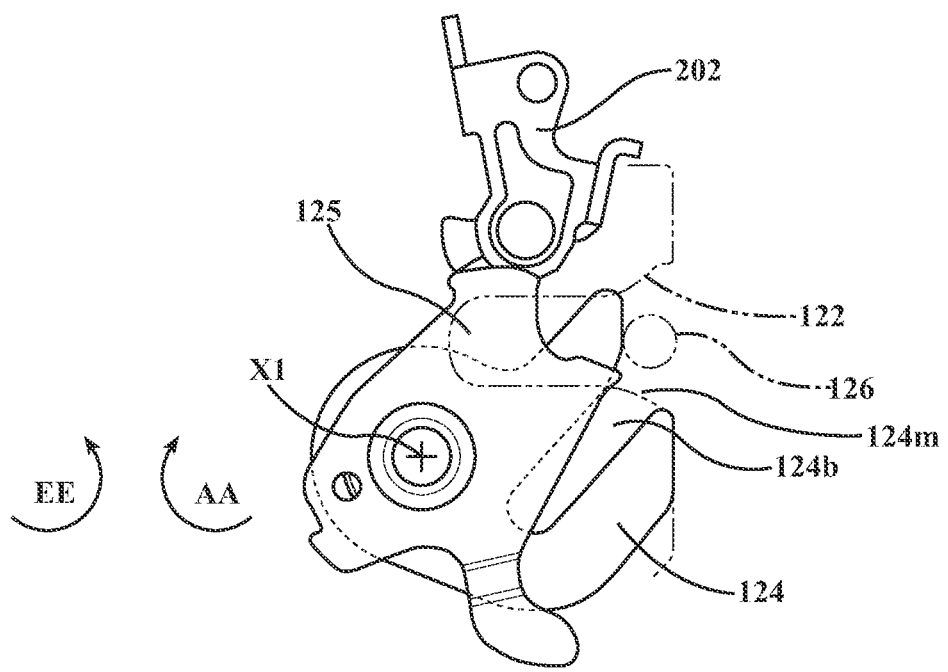

FIGS. 5A-5B show the latch assembly in the idle configuration of FIGS. 3A-3C. In FIGS. 5A-5B, the latch 124 is in the unlatching position and activated for non-revertible movement in the latching direction. Accordingly, the latch 124 is movable in the latching direction from the unlatching position to the half-latched position, and thereafter, is not movable in the unlatching direction past the half-latched position.

In response to a request to automatically close the tailgate 118, the control module 138 may operate the tailgate actuator 150 to close the tailgate 118 until the tailgate 118 reaches the near-closed position. As the tailgate 118 is moved to the near-closed position, the striker 126 passes into the tailgate 118 through the striker chute 122 (FIG. 5B). As it passes into the tailgate 118, the striker 126 rotates the latch 124 in the latching direction EE from the unlatching position toward the half-latched position. Because the latch control member 125 is rotationally connected to the latch 124, the latch control member 125 (which is in engagement with the pawl 202) rotates in correspondence with the latch. This rotation continues until the latch 124 reaches the half-latched position (FIGS. 6A-6B), at which time the connected latch control member 125 engages a surface of the pawl 202 designed to prevent back-rotation of the latch control member 125 and the attached latch in the unlatching direction AA and back toward the unlatch position of the latch. The latch 124 is now activated for non-revertible movement in the latching direction EE by its rotational connection to the latch control member 125 and by the engagement between the latch control member 125 and the pawl 202.

Figure 6A:
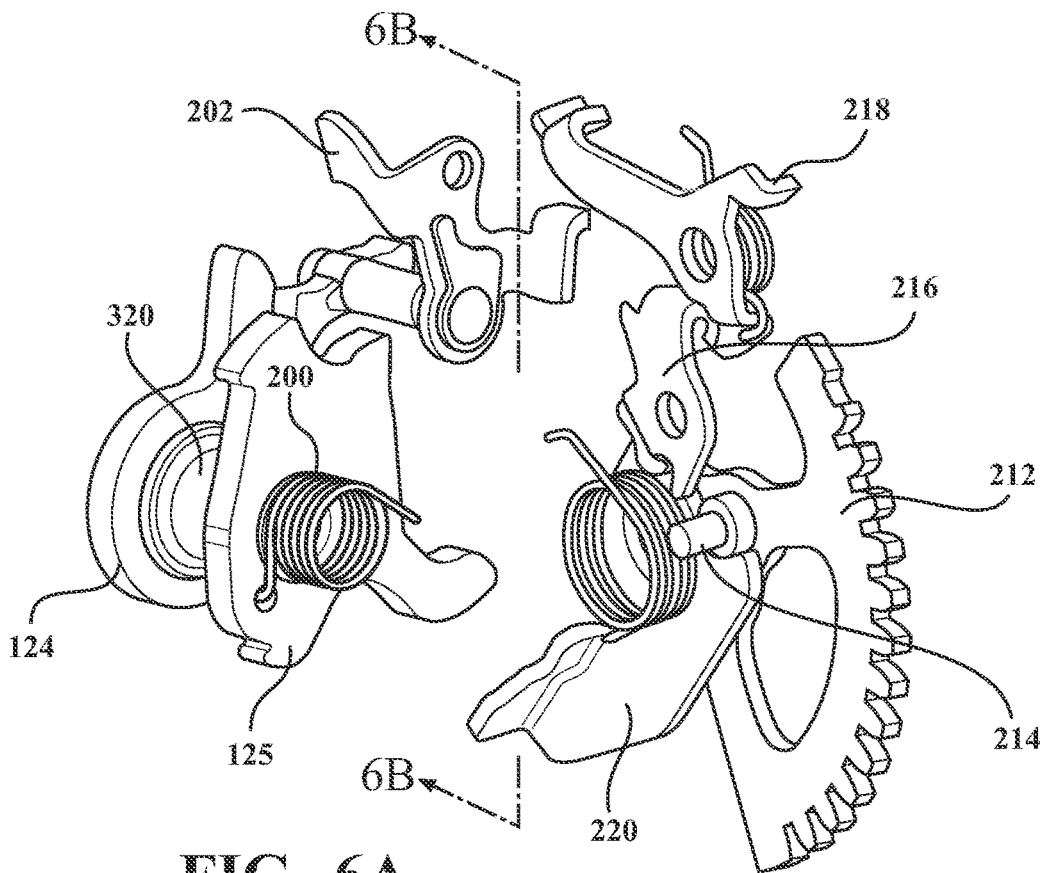
FIGS. 6A and 6B are views of the latch assembly mechanism similar to the views shown in FIGS. 5A and 5B, showing a configuration of the latch assembly when the latch is in a half-latched position engaging a respective tailgate striker to maintain the tailgate in a near-closed position.
Figure 6B:
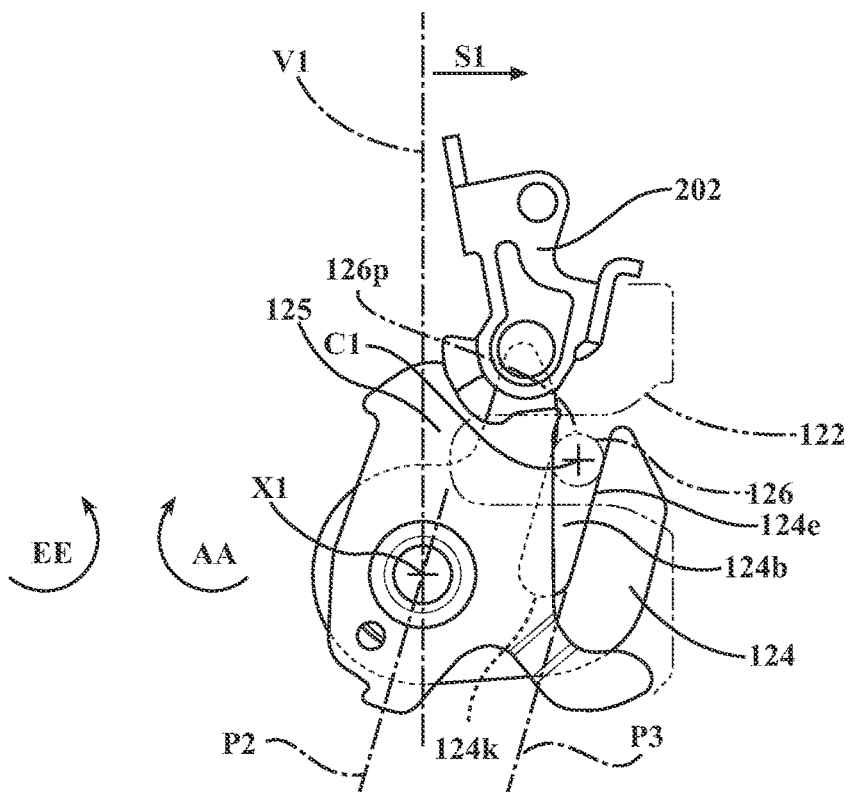

In addition, referring to FIGS. 6A-6B and in one or more arrangements, the latch 124 may be structured so that, with respect to a vertical plane V1 extending through the common rotational axis X1, a centroid C1 of a cross-section of the striker 126 taken through a portion 126*p* of the striker residing inside the slot 124*b* resides along a first side S1 of the plane V1 when the latch 124 is in a half-latched position. In one or more particular arrangements, and as shown in FIGS. 6A-6B, the latch 124 may be structured so that, with respect to the vertical plane V1, the entire cross-section of the striker 126 taken through the portion 126*p* of the striker residing inside the slot 124*b* resides along the first side S1 of the plane V1 when the latch 124 is in the half-latched position.

In one or more arrangements, and as shown in the drawings, a cross-section of the striker 126 taken through the portion 126*p* of the striker residing within the latch slot 124*b* may be a circular cross-section. However, the cross-section of the portion 126*p* of the striker 126 residing within the latch slot 126*b* may have any of a variety of other shapes.

Also, as seen in FIG. 6B, the latch slot 124*b* may be bounded by a flat bearing edge 124*e* structured to engage the striker 126 to move the tailgate 118 in a direction toward an over-closed position of the tailgate when the latch moves in the latching direction EE. In addition, the latch 124 may be structured so that a plane P2 extending through the latch rotation axis X1 and parallel to a plane P3 defined by the slot bearing edge 124*e* resides outside the slot 124*b*. This structural arrangement allows the slot 124*b* to have a greater depth within a given space envelope of the latch, thereby helping to minimize the space occupied by the latch during operation. This aids in maximizing the achievable effective stroke length of the striker 126 during rotation of the latch 124 in the latching direction EE to draw the striker toward the fully-latched and over-stroke positions.

With the latch 124 in the half-latched position and activated for non-revertible movement in the latching direction, the latch 124, although movable in the latching direction EE from the half-latched position to the fully-latched position, is not movable in the unlatching AA direction past the half-latching position because engagement between the pawl 202 and the latch control member 125 prevents rotation of the rotationally connected latch 124 in the unlatching direction AA. Accordingly, the latch 124, unable to move in the unlatching direction AA to the unlatching position, latches the tailgate 118 to the surrounding body 116 against the striker 126 in the near-closed position. The control module 138 may then identify the accompanying half-latching event, and in response to identifying the half-latching event, automatically operate the latch actuator 152 to move the latch control member 125 and the attached latch 124 in the latching direction from the half-latched position to the fully-latched position.

For example, in response to identifying the half-latching event, the control module 138 may operate the latch actuator 152 to rotate the pinion gear 210 in a direction which causes rotation of the mating sector gear 212 in direction BB. Rotation of the sector gear in direction BB produces an arcuate motion of the drive pin 214 in direction BB, until the drive pin 214 engages the latch lever 220. On further rotation of the sector gear 212 in direction BB, the drive pin 214 rotates the latch lever 220 in direction CC, forcing the latch lever 220 into engagement with the latch control member 125. The rotating latch lever 220 then produces a rotation of the latch control member 125 and the attached latch 124 in direction DD. This rotation may continue until the latch 124 reaches the fully-latched position, at which time the rotationally-connected latch control member 125 has engaged another feature of the pawl 202 designed to prevent back-rotation of the latch control member 125 and latch in the unlatching direction AA and back toward the half-latched position of the latch 124. The latch 124 is now locked in the fully-latched position (FIGS. 7A-7B) by engagement of the attached latch control member 125 with the pawl 202, and the tailgate 118 is latched to the surrounding body 116 against the striker 126 in the fully-closed position. As it moves in the latching direction from the half-latched position to the fully-latched position, the latch 124, drawing the striker 126 further into the tailgate 118, moves the tailgate 118 against the striker 126 from the near-closed position to the fully-closed position.

In addition, referring to FIGS. 7A-8B and 10A-10B, and in one or more arrangements, the latch 124 may be structured so that, with respect to the vertical plane V1, the centroid of the cross-section of the striker 126 taken through the portion 126*p* of the striker residing inside the slot 124*b* resides along the first side S1 of the plane V1 when the latch 124 is in a fully-latched position. In one or more particular arrangements, and as shown in FIGS. 7A-8B and 10A-10B, the latch 124 may be structured so that, with respect to the vertical plane V1, the entire cross-section of the striker 126 taken through the portion 126p of the striker residing inside the slot 124b resides along the first side S1 of the plane V1 when the latch 124 is in the fully-latched position.

Figure 7A:
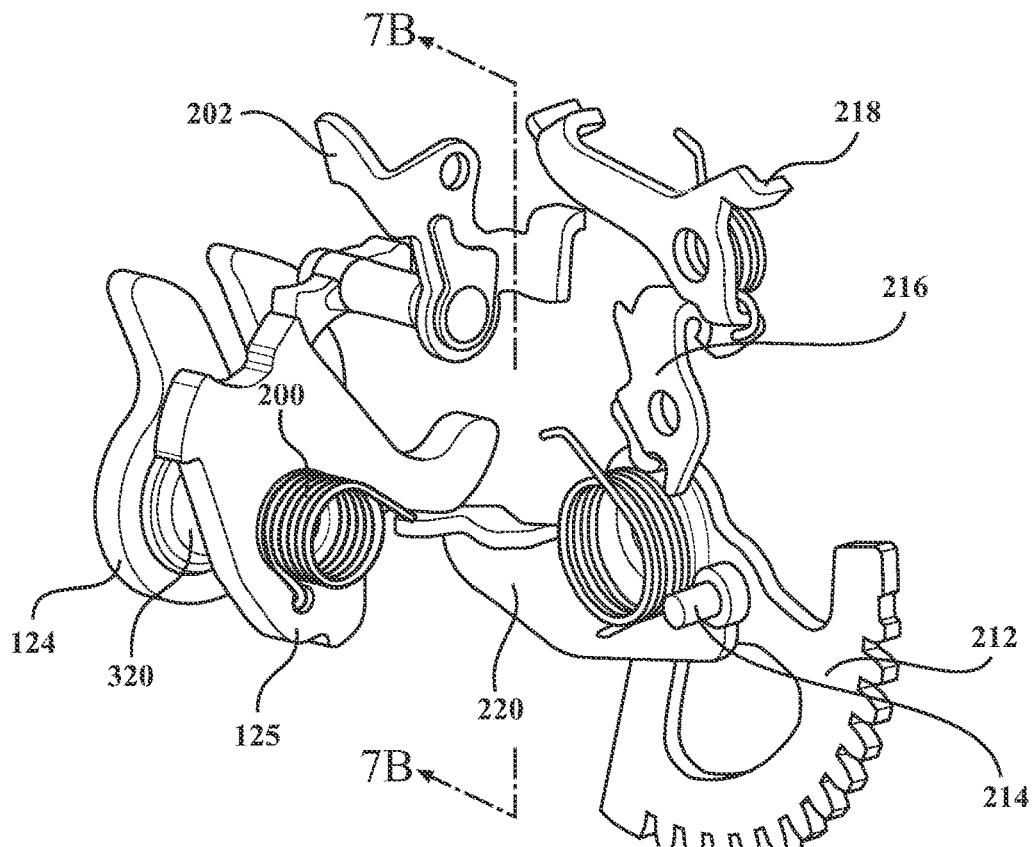
FIGS. 7A and 7B are views of the latch assembly mechanism similar to the views shown in FIGS. 6A and 6B, showing a configuration of the latch assembly during movement of the latch from the half-latched position to a fully-latched position.
Figure 7B:
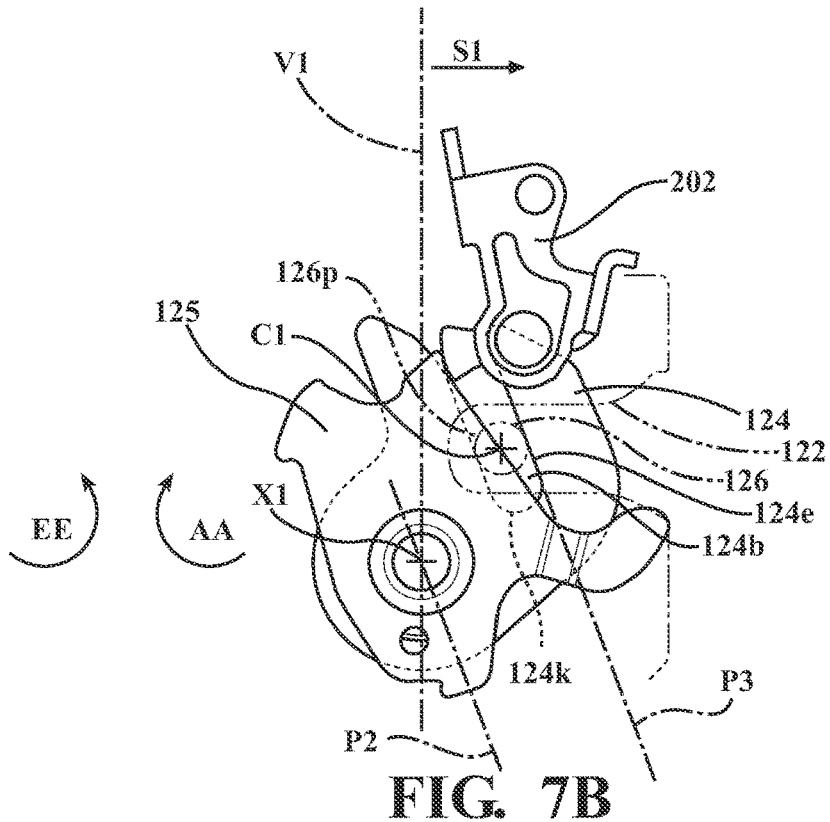

Referring to FIG. 7B, the latch may be structured so that an internal end 124k of the slot 124b resides along the first side S1 of the plane P1 when the latch 124 is in the fully-latched position. An internal end of the slot may be a location along an edge of the slot 124b that is farthest from an opening 124m (FIG. 5B) of the slot into which the striker 126 is received during operation of the latch. For example, in the embodiment shown in the drawings, with the slot 124b ending in a circular edge, the internal end of the slot 124b shown in the drawings may be at the location 124k on the circular edge farthest from the slot opening 124m.

After the controller identifies the full-latching event, pinion gear rotation may be controlled to rotate the sector gear 212, pawl crank 216, pawl lever 218, and latch lever 220 back to their respective positions in the idle configuration while the latch remains locked in the fully-latched position (FIGS. 8A-8B).

Referring now to FIGS. 8A-13, a process of unlatching and opening the tailgate will be described.

With the latch 124 in the fully-latched position engaging the striker 126 and the pawl 202 engaged with the latch control member 125 (FIGS. 8A-8B), the tailgate 118 creates a reactionary force operating between the latch 124/latch control member 125/pawl 202 and the striker 126. The reactionary force may be at least partially due to normal latching forces, a weight component of the tailgate 118, etc. However, the reactionary force may also be at least partially associated with external loading, if any, on the tailgate. Tailgate external loading may be loading arising from cargo loaded in the cargo bed and/or onto the tailgate and which exerts a force on the tailgate. When there is external loading on the tailgate 118, the reactionary force between the striker 126 and the latch 124/latch control member 125/pawl 202 increases to a level above the normal reactionary force due to latching of the striker with no cargo loaded in the tailgate. Thus, as the loading acting on the tailgate increases, the force required to disengage the pawl 202 from the latch control member 125 may also increase. If the pawl 202 is disengaged and the latch 124 released when the tailgate external loading is above a certain predetermined threshold load, damage may occur to the tailgate, the cargo, and/or another portion of the vehicle.

Figure 1D:
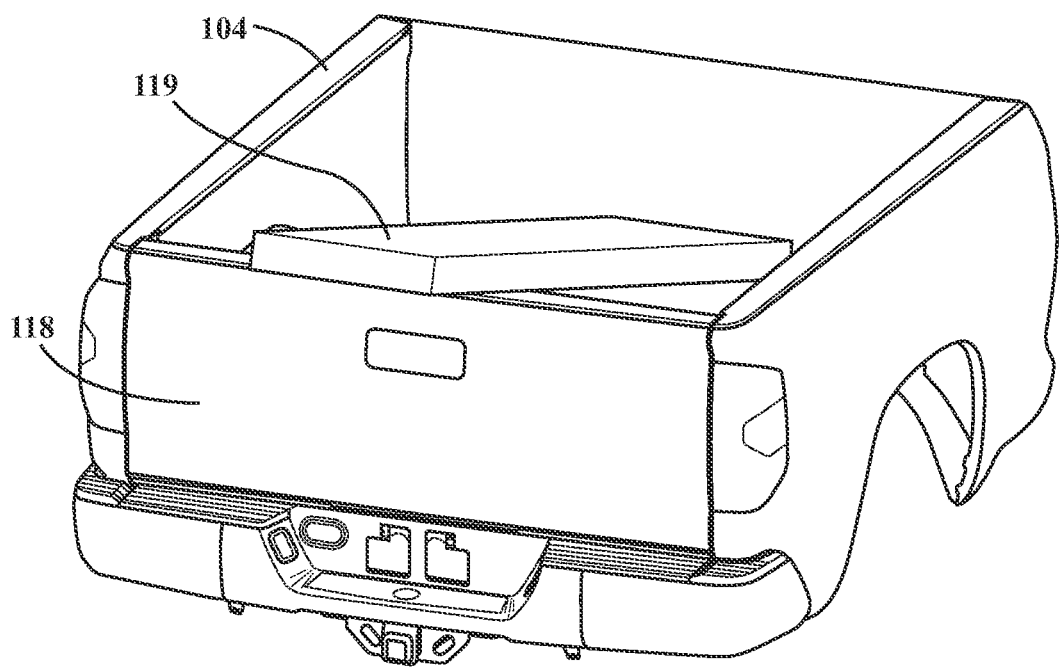
FIG. 1D is a schematic perspective view from a rear of the vehicle showing one example of a condition in which cargo may overload a closed tailgate.

The threshold load may be determined for a given vehicle design, for example, based on calculation and/or iterative experimentation/product testing directed to estimating types and magnitudes of tailgate external loads above which an unacceptable amount of damage may be caused if the tailgate is allowed to open unattended responsive to an opening command. If an external tailgate loading has a magnitude above the predetermined threshold load, the tailgate 118 may be considered "overloaded". FIG. 1D shows one example of a condition in which cargo may overload the closed tailgate. In FIG. 1D, cargo 119 is shown bearing down on the closed and latched tailgate 118.

For purposes of unlatching the tailgate 118, the latch actuator 152 may normally be operated at a first predetermined nominal voltage specified so as to overcome the reactionary force to disengage the pawl 202 from the latch control member 125 when the latch 124/latch control member 125/pawl 202 are acted upon by normal latching forces. The "first predetermined nominal voltage" may be a target or rated operational voltage of the latch actuator, recognizing that the actual operating voltage may vary within a small amount (for example, plus or minus 5%) from the rated voltage. The first predetermined nominal voltage of the latch actuator 152 may also be sufficient to overcome the reactionary force to disengage the pawl 202 from the latch control member 125 even if the tailgate 118 is what would be considered "overloaded". Therefore, to prevent possible damage to the vehicle 100 and/or cargo, it is desirable to prevent release of the latch and opening of the tailgate 118 responsive to an opening command when the tailgate is overloaded.

The latch actuator 152 may normally be operated at the first predetermined nominal voltage for latching the tailgate. In certain cases, users may generate requests to automatically open the tailgate 118 when, unbeknownst to them, there is loading on the tailgate. However, when the tailgate is overloaded, and the system automatically opens the tailgate, the cargo or vehicle may be damaged. Accordingly, in association with automatically opening the tailgate, the system for controlling the power tailgate 118 may be configured to overload check the tailgate using the latch actuator 152 whenever a remotely-generated tailgate opening command is received. More specifically, responsive to receiving a remotely-generated opening command, while the latch 124 is still in the fully-latched position and prior to operating the latch to release the tailgate 118, the control module 138 may control operation of the latch actuator 152 to overload check the tailgate 118 using the latch actuator 152 to come to a determination whether the tailgate 118 is overloaded or not overloaded. When the tailgate 118 is overloaded, the control module 138 may deny requests to automatically open the tailgate 118. The control module 138 may be configured to, under such conditions, deny the requests to automatically open the tailgate 118, and instead, alert the users that the tailgate 118 is overloaded. Accordingly, the vehicle 100, including but not limited to the power tailgate system 142, as well as the cargo itself, does not suffer the threat of damage.

FIGS. 8A-12B show various views of the latch assembly 120 from FIGS. 5A-7B. As shown in FIGS. 8A-12B, for purposes of overload checking the tailgate 118, the latch assembly 120 and the tailgate 118 may be configured such that in addition to an unlatching position, a half-latched position and a fully-latched position, the latch 124 has an over-stroke position (shown in FIGS. 9A-9B) past the fully-latched position and in the latching direction EE. For instance, the latch assembly 120 and the tailgate 118 may be configured such that from the perspective of the latch actuator 152, the latch 124 is substantially unobstructed for movement in the in the latching direction from the fully-latched position to the over-stroke position. The unlatching position, the half-latched position, the fully-latched position and the over-stroke position may be consecutive in the latching direction and in the unlatching direction. FIGS. 9A-9B show rotation of the latch 124 from the fully-latched position (FIGS. 8A-8B) to the over-stroke position (FIGS. 9A-9B).

In addition, referring to FIGS. 9A-9B and in one or more arrangements, the latch 124 may be structured so that, with respect to the vertical plane V1, the centroid C1 of the cross-section of the striker 126 taken through the portion 126p of the striker residing inside the slot 124b resides along the first side S1 of the plane V1 when the latch 124 is in the over-stroke position. In one or more particular arrangements, and as shown in FIGS. 9A-9B, the latch 124 may be structured so that, with respect to the vertical plane V1, the entire cross-section of the striker 126 taken through the portion 126p of the striker residing inside the slot 124b resides along the first side S1 of the plane V1 when the latch 124 is in the over-stroke position.

In particular arrangements, the latch may be structured so that the internal end 124k of the slot 124b resides along the first side S1 of the plane P1 when the latch 124 is in the over-stroke position.

In the context of the vehicle 100, the movement of the latch 124 and the movement of the tailgate 118 may have an interdependent relationship. That is, in correspondence with the unlatching position, the half-latched position, the fully-latched position and the over-stroke position, the tailgate 118 and the surrounding body 116 may be configured such that in addition to one or more open positions, in which the tailgate 118 is unaligned with the surrounding body 116, a near-closed position, in which the tailgate 118 is near alignment with the surrounding body 116, and a fully-closed position, in which the tailgate 118 is in alignment with the surrounding body 116, the tailgate 118 has an over-closed position (shown in FIGS. 9A-9B) past the fully-closed position, which is associated with the over-stroke position of the latch, and in which the tailgate 118 is past alignment with the surrounding body 116. Thus, the latch is in the over-stroke position (or "overstroked") when tailgate is in the over-closed position, and vice versa. The tailgate 118 and the surrounding body 116 may be configured such that from the perspective of the latch actuator 152, the tailgate 118 is substantially unobstructed for movement from the fully-closed position to the over-closed position. In addition, as seen in FIGS. 9A-9B, the latch actuator 152 may disengage the latch control member 125 from the pawl 202 when the latch actuator attempts to move the latch 124 to the over-stroke position (i.e., the pawl 202 is no longer in direct contact with the latch control member 125 during the process of over-stroking the latch 124 and also if, and when, the latch reaches the over-stroke position).

In one or more arrangements, a switch 129 (FIG. 1C) configured to detect a half-latching event (i.e., when the latch is in the half-latched position) may also be configured to detect if and when the latch 124 reaches the over-stroke position.

In one or more arrangements, the tailgate 118 may be overload-checked by controlling operation of the latch actuator 152 to attempt to rotate the latch 124 from the fully-latched position to the over-stroke position (i.e., by attempting to overstroke the latch). When attempting to rotate the latch to the over-stroke position, the control module 138 may use pulse width modulation (PWM) to operate the latch actuator at a second predetermined nominal voltage that may be less than the first predetermined nominal voltage. The second predetermined nominal voltage may be determined such that the resulting force produced by the latch actuator 152 will be sufficient to disengage the pawl 202 from the latch control member 125 only if the reactionary force has a magnitude below the predetermined threshold load. Thus, the tailgate 118 may be prevented from opening responsive to a remotely-generated opening command if the tailgate is overloaded. In particular arrangements, the first predetermined nominal voltage is 12 volts. In particular arrangements, the second predetermined nominal voltage is 8 volts.

Although the process for overload checking is described with reference to one tailgate actuator 150, and one latch actuator 152 and corresponding latch assembly 120 and latch 124, it will be understood that this disclosure is applicable in principle to otherwise similar processes for one or more tailgate actuators 150, one or more latch actuators 152, one or more latch assemblies 120 and one or more latches 124.

Figure 13:
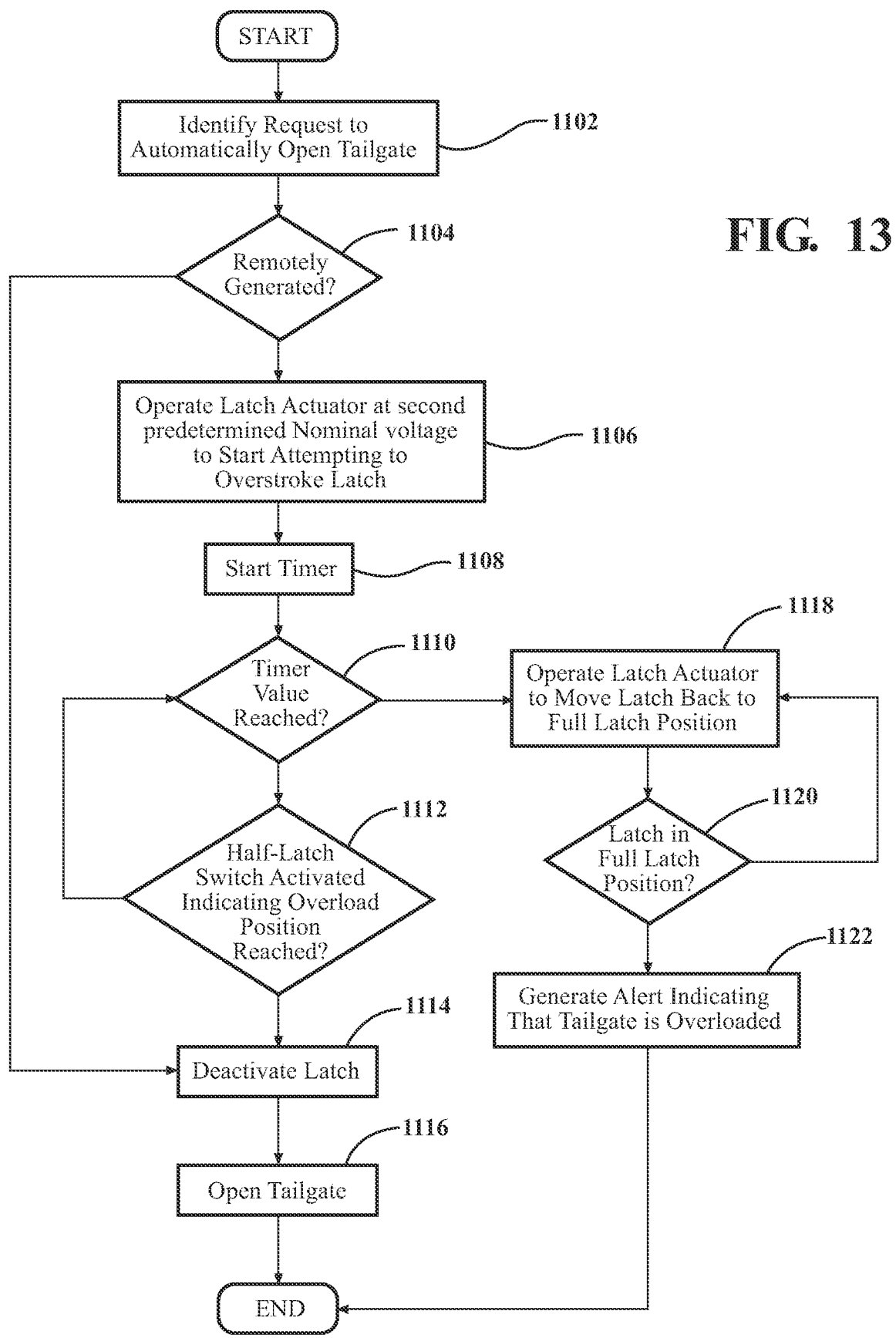
FIG. 13 is a flow diagram showing a method of operation of the latch assembly to overload check the tailgate.

FIGS. 8A-9B shows operation of the latch assembly 120 in moving between the fully-latched position and the over-stroke position of the latch 124 to overload check the tailgate 118. FIGS. 9A-9B show the latch assembly 120 in a configuration in which the latch 124 is in the over-stroke position. FIGS. 10A-12B show a progression of the latch assembly 120 as the latch control member 125 and the latch 124 are restored from the latch over-stroke position (FIGS. 9A, 9B) to the fully-latched position (FIGS. 10A-10B). The pawl 202 is then rotated to release the latch control member 125/latch 124 as previously described (FIGS. 11A-11B), allowing the latch control member 125/latch 124 to rotate in the unlatching direction AA (FIGS. 12A-12B) to the unlatched position of the latch. FIG. 13 is a flow diagram showing a method of operation of the latch assembly to overload check the tailgate.

Referring to FIGS. 8A-13, starting in the fully-latched position of the latch assembly 120 shown in FIGS. 8A-8B, as part of its evaluation of the information about the vehicle 100, the control module 138 monitors for and identifies a request to automatically open the tailgate 118. When the control module 138 does not identify a request to automatically open the tailgate 118, it continues to monitor for requests to automatically open the tailgate 118 in anticipation that a request to automatically open the tailgate 118 will materialize.

In block 1102 (FIG. 13), the control module 138 may identify a request to automatically open the tailgate 118. In block 1104, responsive to the identification of a request to automatically open the tailgate 118, the control module 138 may determine if the tailgate opening request was remotely generated. If the tailgate opening request was not remotely generated, it is assumed that a user is in physical proximity to the tailgate 118 and can view the tailgate to determine whether or not it is overloaded. Thus, under the assumption that the tailgate 118 is not overloaded if the tailgate opening request was not remotely generated, the control module 138 may (in block 1114) control operation of the latch actuator 152 to deactivate the latch 124. The control module 138 may then (in block 1116) control operation of the tailgate actuator 150 to open the tailgate 118.

Returning to block 1104, if the tailgate opening request was remotely generated, the control module 138 may (in block 1106), starting from the fully-latched position (FIGS. 8A-8B), operate the latch actuator 152 to attempt to move the latch control member 125/latch 124 in the latching direction from the fully-latched position to the over-stroke position (FIGS. 9A-9B). For instance, the control module 138 may operate the latch actuator 152 to move the latch 124 in the latching direction until it identifies an over-stroking event by activation of the half-latched switch 129 as previously described. In one or more arrangements, the control module 138 may use pulse width modulation (PWM) to operate the latch actuator at a lower voltage to over-stroke the latch according to operation. In a particular arrangement, the latch actuator 152 may be operated at a voltage of 8 V to over-stroke the latch 124, instead of at the normal 12 V operating voltage. As it moves in the latching direction from the fully-latched position toward the over-stroke position, the latch 124, drawing the striker 126 further into the tailgate 118, moves the tailgate against the striker from the fully-closed position to the over-closed position.

Simultaneously with (or immediately after) beginning to move the latch 124 in the latching direction from the fully-latched position, the control module 138 may (in block 1108) start a timer. The timer may be configured to monitor a time elapsed from when the actuator starts to attempt to move the latch 124 from the fully-latched position to the over-stroke position. If the latch actuator 152 is unable to rotate the latch to the over-stroke position after a predetermined time period, it is determined that an overload condition is affecting the tailgate 118.

After activation of the timer, the control module 138 may (in block 1110) determine if the predetermined time period has elapsed. If the predetermined time period has not elapsed, the control module 138 may (in block 1112) determine if the latch 124 has reached the over-stroke position (i.e., the control module may determine if the half-latched switch 129 has been activated). If the predetermined time period has not elapsed and the latch 124 has not reached the over-stroke position, control may return to block 1110. The loop 1110-1112 may continue while the predetermined time period has not elapsed and the latch 124 has not reached the over-stroke position. If the predetermined time period has not elapsed and the latch 124 has reached the over-stroke position, the control module 138 may (in block 1114) determine that no overload condition affects the tailgate because the latch reached the over-stroke position within the predetermined time period. Thus, the control module may deactivate the latch 124, allowing the tailgate to be opened (block 1116).

Returning to block 1110, if the predetermined time period has elapsed and the latch 124 has not reached the over-stroke position, the control module 138 may determine that an overload condition is affecting the tailgate 118. The control module 138 may then (in block 1118) control operation of the latch actuator 152 to rotate the latch 124 back to the fully-latched position (FIGS. 10A-10B). When the latch 124 has returned to the fully-latched position (block 1120), the control module 138 may (in block 1122) generate an alert configured to indicate to a user that the tailgate is overloaded.

Returning to FIGS. 10A-10B, if the tailgate is determined not to be affected by an overload condition, and starting from the fully-latched position, the control module 138 may operate the latch actuator 152 to deactivate the latch 124 for movement in the unlatching direction responsive to the tailgate opening request. For example, the pinion gear 210 may be operated to rotate the mating sector gear 212 in direction FF (FIG. 3A) bringing the drive pin 214 into engagement with the pawl crank 216. Further rotation of the sector gear 212 causes the drive pin 214 to rotate the pawl crank 216 in direction BB. Rotation of the pawl crank 216 in direction BB produces an opposite rotation (in direction FF) of the pawl lever 218 which is engaged by the pawl crank 216. During rotation of the pawl lever 218 in direction FF, the pawl lever 218 engages the pawl 202 and forces the pawl to rotate out of engagement with the latch control member 125 (FIGS. 11A, 11B), thereby allowing the latch control member 125 and rotationally-connected latch 124 to rotate toward the unlatching position (FIGS. 12A, 12B) under influence of the latch control member biasing spring 200. This allows the tailgate 118 to detach from the striker. The control module 138 may then operate the tailgate actuator 150 to open the tailgate 118. As the tailgate 118 is moved to the open positions, the striker 126 passes out of the tailgate 118 through the striker chute 122. As it passes out of the tailgate 118, the striker 126, in combination with the bias for movement of the latch in the unlatching direction, moves the latch 124 in the unlatching direction to the unlatching position.

The control module 138 may then identify the accompanying unlatching event, and in response to identifying the unlatching event, may operate the latch actuator 152 to control rotation of the pinion gear 210 to rotate the sector gear 212, pawl crank 216, pawl lever 218, and latch lever 220 back to their respective positions in the idle configuration, thereby activating the latch 124 for non-revertible movement in the latching direction.

With reference once again to FIG. 1C, as noted above, the processors 134, the memory 136 and the control module 138 together serve as a computing device whose control module 138 orchestrates the operation of the vehicle 100, including but not limited to the operation of the vehicle systems 130. The control module 138 may be a dedicated control module for the power tailgate system 142, and may be housed, in whole or in part, in the tailgate 118. Relatedly, as part of a central control system, the vehicle 100 may include a global control unit (GCU) to with which the control module 138 is communicatively connected. Alternatively, the control module 138 may be a global control module. Relatedly, as part of a central control system, the vehicle 100 may include a global control unit (GCU) to which the control module 138 belongs. Although the vehicle 100, as shown, includes one control module 138, it will be understood that this disclosure is applicable in principle to otherwise similar vehicles 100 including multiple control modules 138.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5B, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally speaking, the control module 138 includes instructions that may be executed by the processors 134. The control module 138 may be implemented as computer readable program code that, when executed by the processors 134, execute one or more of the processes described herein. Such computer readable program code may be stored on the memory 136. The control module 138 may be part of the processors 134, or may be communicatively connected the processors 134.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The processors 134 may be any components configured to execute any of the processes described herein or any form of instructions to carry out such processes or cause such processes to be performed. The processors 134 may be implemented with one or more general-purpose or special-purpose processors. Examples of suitable processors 134 include microprocessors, microcontrollers, digital signal processors or other forms of circuitry that execute software. Other examples of suitable processors 134 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 134 may include at least one hardware circuit (e.g., an integrated circuit) configured to carry out instructions contained in program code. In arrangements where there are multiple processors 134, the processors 134 may work independently from each other or in combination with one another.

The memory 136 is a non-transitory computer readable medium. The memory 136 may include volatile or nonvolatile memory, or both. Examples of suitable memory 136 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 136 includes stored instructions in program code. Such instructions are executable by the processors 134 or the control module 138. The memory 136 may be part of the processors 134 or the control module 138, or may be communicatively connected the processors 134 or the control module 138.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for controlling a vehicle power tailgate, the system comprising:
   a latch structured to be movable to a latching position when the latch is engaged with a portion of a tailgate so as to maintain the tailgate in a closed position associated with the latching position of the latch;
   a latch lever operably connected to the latch so as to enable movement of the latch to an over-stroke position of the latch by rotation of the latch lever in a first direction of the lever;

a pawl operably connected to the latch and structured to be rotatable to a first position to maintain the latch in a fully-latched position of the latch;

a sector gear operably connected to the latch lever and to the pawl so as to provide rotation of the latch to the over-stroke position of the latch while the pawl resides in the first position, by rotation of the sector gear in a first direction of the gear, and so as to provide rotation of the pawl to the second position of the pawl, by rotation of the sector gear in a second direction of the gear opposite the first direction of the gear;

a latch actuator operably connected to the sector gear to control rotation of the sector gear in the first and second directions of the gear;

a processor; and a memory communicably coupled to the processor and storing a tailgate control module including instructions that, when executed by the processor, cause the processor to, responsive to receipt of a tailgate opening command:

control operation of the latch actuator to rotate the sector gear in the first direction of the gear so as to attempt to move the latch to the over-stroke position; and responsive to a failure of the attempt to move the latch to the over-stroke position within a predetermined time period, generate an alert indicating that the tailgate is overloaded.

2. The system of claim 1 wherein the memory includes instructions that when executed by the processor cause the processor to, responsive to the latch reaching the over-stroke position within the predetermined time period, control operation of the latch actuator to release the latch, thereby enabling the tailgate to disengage from the latch and open.

3. The system of claim 1 further comprising a switch configured to detect both a movement of the latch to a half-latching position and a movement of the latch to the over-stroke position.

4. The system of claim 1 wherein the latch actuator is configured to operate at a first predetermined nominal voltage when the latch actuator is not attempting to move the latch to the over-stroke position, and wherein the latch actuator is configured to operate at a second predetermined nominal voltage less than the first predetermined nominal voltage when the latch actuator is attempting to move the latch to the over-stroke position.

5. The system of claim 4 wherein the first predetermined nominal voltage is 12 volts.

6. The system of claim 4 wherein the second predetermined nominal voltage is 8 volts.

7. The system of claim 1 wherein the pawl is structured to be rotatable to a second position to release the latch from the fully-latched position of the latch, and wherein the memory includes instructions that when executed by the processor cause the processor to, responsive to movement of the latch to the over-stroke position within the predetermined time period:

control operation of the latch actuator to rotate the latch lever so as to enable the latch to reach the fully-latched position of the latch; and control operation of the latch actuator to rotate the sector gear in the second direction of the gear so as to provide rotation of the pawl to the second position of the pawl.

8. The system of claim 1, wherein the memory further stores instructions that when executed by the processor cause the processor to:

identify a request to automatically open the tailgate;

identify whether the request to automatically open the tailgate is remotely generated or non-remotely generated; and whenever the request to automatically open the tailgate is remotely generated, control operation of the latch actuator to attempt to move the latch to the over-stroke position.

9. The system of claim 1 further comprising:

a pawl operably connected to the latch and structured to maintain the latch in a fully-latched position of the latch; and a latch control member rotationally connected to the latch and structured to be engageable by the pawl to maintain the latch control member in a position associated with the fully latched position of the latch, and wherein the latch actuator is structured to disengage the latch control member from the pawl when the latch actuator attempts to move the latch to the over-stroke position.

10. In a powered latch assembly for a vehicle tailgate, a method of checking for an overload condition of a tailgate secured in a closed condition by a latch prior to releasing the latch to enable opening of the tailgate, the latch assembly including:

a latch structured to be movable to a latching position when the latch is engaged with a portion of a tailgate so as to maintain the tailgate in a closed position associated with the latching position of the latch;

a pawl operably connected to the latch and structured to be rotatable to a first position to maintain the latch in a fully-latched position of the latch, and to a second position to release the latch from the fully-latched position of the latch;

a sector gear operably connected to the latch and to the pawl so as to provide rotation of the latch to an over-stroke position of the latch while the pawl resides in the first position, by rotation of the sector gear in a first direction of the gear, and so as to provide rotation of the pawl to the second position by rotation of the sector gear in a second direction of the gear opposite the first direction of the gear; and a latch actuator operably connected to the sector gear to control rotation of the sector gear in the first and second directions of the gear, the method comprising steps of:

responsive to receipt of a tailgate opening command:

controlling operation of the latch actuator to rotate the sector gear in the first direction of the gear so as to attempt to move the latch to an over-stroke position; and responsive to a failure of the attempt to move the latch to the over-stroke position within a predetermined time period, generating an alert indicating that the tailgate is overloaded.

11. The method of claim 10 wherein the latch actuator is configured to operate at a first predetermined nominal voltage when the latch actuator is not attempting to move the latch to the over-stroke position, and wherein the latch actuator is configured to operate at a second predetermined nominal voltage less than the first predetermined nominal voltage when the latch actuator is attempting to move the latch to the over-stroke position.

12. The method of claim 11 wherein the first predetermined nominal voltage is 12 volts.

13. The method of claim 11 wherein the second predetermined nominal voltage is 8 volts.

14. The method of claim 10 further comprising a step of, responsive to movement of the latch to the over-stroke position within the predetermined time period:
- controlling operation of the latch actuator to rotate the latch lever so as to enable the latch to reach the fully-latched position of the latch; and
- controlling operation of the latch actuator to rotate the sector gear in the second direction of the gear so as to provide rotation of the pawl to the second position of the pawl.

15. The method of claim 10 further comprising steps of:
- identifying a request to automatically open the tailgate;
- identifying whether the request to automatically open the tailgate is remotely generated or non-remotely generated; and
- whenever the request to automatically open the tailgate being remotely generated, controlling operation of the latch actuator to attempt to move the latch to the over-stroke position.

16. A system for controlling a vehicle power tailgate, the system comprising:
- a latch structured to be rotatable to a latching position when the latch is engaged with a portion of a tailgate, so as to maintain the tailgate in a closed position associated with the latching position;
- a latch control member rotationally connected to the latch;
- a pawl operably connected to the latch and structured to be rotatable to physically contact the latch control member to maintain the latch control member in a position associated with the latching position of the latch;
- a pawl lever structured to be rotatable in a first direction to physically contact the pawl to rotate the pawl out of physical contact with the latch control member;
- a pawl crank structured to be rotatable to physically contact the pawl lever to rotate the pawl lever into physical contact with the pawl;
- a latch lever structured to be rotatable to physically contact the latch control member to rotate the latch control member to a position associated with an over-stroke position of the latch;
- a sector gear structured to be rotatable in a first direction to physically contact and rotate the latch control member, and rotatable in a second direction opposite the first direction to physically contact and rotate the pawl crank into physical contact with the pawl lever;
- a latch actuator structured to selectively rotate the sector gear in any of the first direction and the second direction;
- a processor; and
- a memory communicably coupled to the processor and storing a tailgate control module including instructions that, when executed by the processor, cause the processor to:
- responsive to receipt of any remotely generated tailgate opening commands, control operation of the latch actuator to rotate the sector gear so as to rotate the latch lever so as to attempt to move the latch to the over-stroke position of the latch; and
- responsive to a failure of the attempt to move the latch to the over-stroke position within a predetermined time period, generate an alert indicating that the tailgate is overloaded.

* * * * *